(12) United States Patent
Nakayama et al.

(10) Patent No.: US 6,800,865 B2
(45) Date of Patent: Oct. 5, 2004

(54) COATED NANOTUBE SURFACE SIGNAL PROBE AND METHOD OF ATTACHING NANOTUBE TO PROBE HOLDER

(75) Inventors: Yoshikazu Nakayama, Hirakata (JP); Akio Harada, Osaka (JP); Seiji Akita, Izumi (JP)

(73) Assignees: Daiken Chemical Co., Ltd., Osaka (JP); Yoshikazu Nakayama, Osaka (JP)

(*) Notice: Subject to any disclaimer, the term of this patent is extended or adjusted under 35 U.S.C. 154(b) by 0 days.

(21) Appl. No.: 10/326,472

(22) Filed: Dec. 20, 2002

(65) Prior Publication Data

US 2003/0122073 A1 Jul. 3, 2003

Related U.S. Application Data

(62) Division of application No. 09/601,668, filed as application No. PCT/JP99/06359 on Nov. 12, 1999, now Pat. No. 6,528,785.

(30) Foreign Application Priority Data

| Dec. 3, 1998 | (JP) | ............................................. 10-376642 |
| Dec. 31, 1998 | (JP) | ............................................. 10-378548 |
| Mar. 19, 1999 | (JP) | ............................................. 11-116939 |
| Mar. 19, 1999 | (JP) | ............................................. 11-116940 |

(51) Int. Cl.$^7$ .............................................. G21G 5/00
(52) U.S. Cl. .................... 250/492.3; 313/310; 73/1.89; 436/164
(58) Field of Search ............................ 250/492.3, 306, 250/307; 313/310; 73/1.89, 105; 436/164; 216/11

(56) References Cited

U.S. PATENT DOCUMENTS 6,457,350 B1 * 10/2002 Mitchell ...................... 73/105

FOREIGN PATENT DOCUMENTS

| JP | H6-331309 | * 12/1994 |
| JP | H10-208208 | * 8/1998 |
| WO | WO 98/05920 | * 2/1998 |

OTHER PUBLICATIONS

Hongjie Dai et al., "Nanotubes as nanoprobes in scanning probe microscopy," *Nature*, vol. 384, No. 6605, pp. 147–150, Nov. 1996 (London).*

Stanislaus S. Wong et al., "Carbon Nanotube Tips: High-Resolution Probes for Imaging Biological Systems," *Journal of The American Chemical Society*, vol. 120, No. 3, pp. 603–604, Jan. 1998 (USA.*

Y. Nakayama, "Carbon Nanotube ga AFM (Atomic Force Microscope) no Tip ni natta", *Kagaku*, vol. 54, No. 8, pp. 42–47, Aug. 1999 (Japan).*

Kunitoshi Yamamoto et al., "Rapid Communication Orientation and purification of carbon nanotubes using ac electrophoresis," *Journal of Physics D: Applied Physics*, vol. 31, No. 8, pp. L34–36, Apr. 1998 (U.K).*

* cited by examiner

Primary Examiner—John R. Lee
Assistant Examiner—Kalimah Fernandez
(74) Attorney, Agent, or Firm—Koda & Androlia

(57) ABSTRACT

The coated nanotube surface signal probe constructed from a nanotube, a holder which holds the nanotube, a coating film fastening a base end portion of the nanotube to a surface of the holder by way of adhering the base end portion on the surface of holder in a range of a base end portion length with an electric contact state and covering a specified region including the base end portion with the coating film maintaining the electric contact state between the nanotube and the holder, a tip end portion of the nanotube being caused to protrude from the holder; and the tip end portion is used as a probe needle so as to scan surface signals. The coated nanotube surface signal probe can be used as a probe in AFM (Atomic Force Microscope), STM (Scanning Tunneling Microscope) other SPM (Scanning Probe Microscope).

1 Claim, 23 Drawing Sheets

Bending Nanotube

COATED NANOTUBE SURFACE SIGNAL PROBE AND METHOD OF ATTACHING NANOTUBE TO PROBE HOLDER

This is a Divisional Application of application Ser. No. 09/601,668, filed Aug. 3, 2000 now U.S. Pat No. 6,528,785.

TECHNICAL FIELD

The present invention relates to a surface signal operating probe for an electronic device which uses a nanotube such as a carbon nanotube, BCN type nanotube, BN type nanotube, etc. as a probe needle. More particularly, the present invention relates to an electronic device surface signal operating probe which realizes a concrete method for fastening a nanotube to a holder, and which can be used as the probe needle of a scanning probe microscope that picks up images of surfaces of samples by detecting physical or chemical actions on the sample surfaces or as the input-output probe needle of a magnetic disk drive; and it further relates to a method for manufacturing such a probe.

BACKGROUND ART

Electron microscopes have been available in the past as microscopes for observing sample surfaces at a high magnification. However, since an electron beam will only travel through a vacuum, such microscopes have suffered from various problems in terms of experimental techniques. In recent years, however, a microscopic technique known as a "scanning probe microscope" has been developed which makes it possible to observe surfaces at the atomic level even in the atmosphere. In this microscope, when the probe needle at the tip end of the probe is caused to approach very close to the sample surface at an atomic size, physical and chemical actions of the individual atoms of the sample can be detected, and an image of the sample surface can be developed from detection signals while the probe needle is scanned over the surface.

The first microscope of this type is a scanning tunnel microscope (also abbreviated to "STM"). Here, when a sharp probe needle located at the tip end is caused to approach to a distance at which the attractive force from the sample surface can be sensed, e.g., approximately 1 nm (attractive force region), a tunnel current flows between the atoms of the sample and the probe needle. Since there are indentations and projections on the sample surface at the atomic level, the probe needle is scanned across the sample surface while being caused to approach and recede from the sample surface so that the tunnel current remains constant. Since the approaching and receding signals from the probe needle correspond to the indentations and projections in the sample surface, this device can pick up an image of the sample surface at the atomic level. A weak point of this device is that the tip end of the probe needle made of a conductive material must be sharpened in order to increase the resolution.

The probe needle of an STM is formed by subjecting a wire material of platinum, platinum-iridium or tungsten, etc., to a sharpening treatment. Mechanical polishing methods and electrolytic polishing methods are used for this sharpening treatment. For example, in the case of platinum-iridium, a sharp sectional surface can be obtained merely by cutting the wire material with the nippers of a tool. However, not only is the reproducibility inaccurate, but the curvature radius of the tip end is large, i.e., around 100 nm, and such a curvature radius is inadequate for obtaining sharp atomic images of a sample surface with indentations and projections.

Electrolytic polishing is utilized for tungsten probe needles. FIG. 25 is a schematic diagram of an electrolytic polishing apparatus. A platinum electrode 80 and a tungsten electrode 81, which constitutes the probe needle, are connected to an AC power supply 82 and are suspended in an aqueous solution of sodium nitrite 83. As current flows, the tungsten electrode 81 is gradually electrolyzed in the solution, so that the tip end of this electrode is finished into the form of a needle. When polishing is completed, the tip end is removed from the liquid surface; as a result, a tungsten probe needle 84 of the type shown in FIG. 26 is completed. However, even in the case of this tungsten probe needle, the curvature radius of the tip end is about 100 nm, and indentations and projects formed by a few atoms or more cannot be sharply imaged.

The next-developed scanning type probe microscope is the atomic force microscope (abbreviated as "AFM"). In the case of an STM, the probe needle and sample must as a rule be conductors in order to cause the flow of the tunnel current. Accordingly, the AFM is to observe the surfaces of non-conductive substances. In the case of this device, a cantilever 85 of the type shown in FIG. 27 is used. The rear end of this cantilever 85 is fastened to a substrate 86, and a pyramid-form probe needle 87 is formed on the front end of the cantilever 85. A point part 88 is formed on the tip end of the probe needle by a sharpening treatment. The substrate 86 is mounted on a scanning driving part. When the point part is caused to approach the sample surface to a distance of approximately 0.3 nm from the sample surface, the point part receives a repulsive force from the atoms of the sample. When the probe needle is scanned along the sample surface in this state, the probe needle 87 is caused to move upward and downward by the above-described repulsive force in accordance with the indentations and projections of the surface. The cantilever 85 then bends in response to this in the manner of a "lever". This bending is detected by the deviation in the angle of reflection of a laser beam directed onto the back surface of the cantilever, so that an image of the surface is developed.

FIG. 28 is a diagram of the process used to manufacture the above-described probe needle by means of a semiconductor planar technique. An oxide film 90 is formed on both surfaces of a silicon wafer 89, and a recess 91 is formed in one portion of this assembly by lithography and etching. This portion is also covered by an oxide film 92. The oxide films 90 and 92 are converted into $Si_3N_4$ films 93 by a nitrogen treatment; then, the entire undersurface and a portion of the upper surface are etched so that a cut part 94 is formed. Meanwhile, a large recess 96 is formed in a glass 95, and this is anodically joined to the surface of the $Si_3N_4$ film. Afterward, the glass part 97 is cut, and the silicon part 98 is removed by etching. Then, the desired probe needle is finished by forming a metal film 99 used for laser reflection. Specifically, the cantilever 85, substrate 86, probe needle 87 and point part 88 are completed.

This planar technique is suited for mass production; however, the extent to which the point part 88 can be sharpened is a problem. In the final analysis, it is necessary either to sharply etch the tip end of the recess 91, or to sharpen the tip end of the probe needle 87 by etching. However, even in the case of such etching treatments, it has been difficult to reduce the curvature radius of the tip end of the point part 88 to a value smaller than 10 nm. The indentations and projections on the sample surface are at the atomic level, and it is necessary to reduce the curvature radius of the tip end of the point part 88 to a value of 10 nm or less in order to obtain sharp images of these indentations and projections. However, it has been impossible to achieve such a reduction in the curvature radius using this technique.

If artificial polishing and planar techniques are useless, the question of what to use for the probe needle, which is the deciding element of the probe, becomes an important problem. One approach is the use of whiskers (whisker crystals). Zinc oxide whiskers have actually been utilized as probe needles. Whisker probe needles have a smaller tip end angle and tip end curvature than pyramid needles produced by planar techniques, and therefore produce sharper images. However, whisker manufacturing methods have not been established, and the manufacture of conductive whiskers for STM use has not yet been tried. Furthermore, whiskers with the desired cross-sectional diameter of 10 nm or less have not yet been obtained.

Furthermore, such probe needles have suffered from many other problems: e.g., such probe needles are easily destroyed by strong contact with the sample surface, and such needles quickly become worn under ordinary use conditions, so that use becomes impossible.

In recent years, therefore, the idea of using carbon nanotubes as probe needles has appeared. Since carbon nanotubes are conductive, they can be used in both AFM and STM. A carbon nanotube probe needle has been proposed as a high-resolution probe for imaging biological systems in J. Am. Chem. Soc., Vol. 120 (1998), p. 603. However, the most important points, i.e., the question of how to collect only carbon nanotubes from a carbon mixture, and the question of how to fasten carbon nanotubes to a holder, remain completely unsolved. In this reference as well, the use of an assembly in which a carbon nanotube is attached to a holder by means of inter-molecular force is mentioned only in passing.

Furthermore, besides carbon nanotubes, BCN type nanotubes and BN type nanotubes have also been developed as nanotubes. However methods of utilizing such nanotubes have remained completely in the realm of the unknown.

On a different subject, memory devices have evolved from floppy disk drives to hard disk drives, and further to high-density disk drives, as the memory capacity of computers has increased in recent years. As information is packed into smaller spaces at higher densities, the size per bit of information decreases; accordingly, a finer probe needle is also required for input-output. In conventional magnet head devices, it is impossible to reduce the size of the probe needle beyond a certain fixed value, so that there are limits to the trend toward higher density.

As described above, systematic conventional techniques for sharpening probe needles are electrolytic polishing of metal wire materials and lithography and etching treatments of semiconductors. In the case of these treatments, however, the tip end curvature radius of the probe needle can only be sharpened to about 100 nm; accordingly, it is very difficult to obtain sharp images of indentations and projections formed by a few atoms or more on the sample surface. Furthermore, the degree of sharpness obtained by mechanically cutting metal wire materials with a tool such as nippers, etc. is also insufficient to capture sharp images of indentations and projections. The use of whiskers is still an uncertain technique, and the use of nanotube probe needles such as carbon nanotubes, etc. has been a task for the future. Furthermore, conventional magnetic head devices have also approached their limit in terms of size.

Accordingly, the object of the present invention is to provide the utilization of nanotubes with a small tip end curvature radius as surface signal operating probe needles and further to establish a concrete structure for probes using nanotube probe needles, and a method for manufacturing the same. The present invention shows that such nanotube probe needles are not easily destroyed even when they contact atomic-level projections during probe needle scanning, that such probe needles can be firmly fastened to the holder so that the probe needle will not come loose from the holder during such scanning, and that such probe needles can be inexpensively mass-produced. Furthermore, the present invention shows that samples that could not be observed with high resolution in the past can be clearly observed using the nanotube probe needles thus manufactured.

DISCLOSURE OF INVENTION

The present invention is to accomplish the above-described object. The surface signal operating probe for electronic devices of the present invention is characterized in that the probe comprises a nanotube, a holder which holds the nanotube, and a fastening means which fastens the base end portion of the nanotube to the surface of the holder so that the tip end portion of the nanotube protrudes; and surface signals are operated by the tip end portion of the nanotube that is used as a probe needle.

The present invention provides a surface signal operating probe in which the fastening means is a coating film, and the nanotube is fastened to the holder by covering a specified region of the nanotube including the base end portion by means of the coating film.

Furthermore, the present invention provides a surface signal operating probe in which the fastening means is a fused part, and the base end portion of the nanotube is fusion-welded to the holder by this fused part.

The present invention provides a surface signal operating probe in which the above-described electronic device is a scanning probe microscope, and physical and chemical actions on the sample surface are detected by the nanotube used as a probe needle. Such a scanning probe microscope includes scanning tunnel microscopes, atomic force microscopes, etc.

Furthermore, the present invention provides a surface signal operating probe in which the above-described electronic device is a magnetic information processing device, and magnetic information is inputted onto and outputted from a magnetic recording medium by the nanotube.

As a method for manufacturing this probe, the present invention provides a method for manufacturing an electronic device surface signal operating probe, and this method comprises a first process in which a voltage is applied across electrodes in an electrophoretic solution in which a nanotube that constitutes the probe needled is dispersed, so that this nanotube is caused to adhere to the one of the electrodes for DC voltage or to both electrodes for AC voltage in a protruding fashion, a second process in which the electrode to which the nanotube is attached in a protruding fashion and a holder are caused to approach very closely to each other, and the nanotube is transferred to the holder so that the base end portion of the nanotube adheres to the holder surface in a state in which the tip end portion of the nanotube is caused to protrude, and a third process in which a specified region that includes at least the base end portion of the nanotube adhering to the holder surface is subjected to a coating treatment so that the nanotube is fastened to the holder by the resulting coating film.

Furthermore, the present invention provides a method for manufacturing an electronic device surface signal operating probe, and this method comprises a first process in which a voltage is applied across electrodes in an electrophoretic solution in which a nanotube that constitutes the probe needled is dispersed, so that this nanotube is caused to adhere to the electrodes in a protruding fashion, a second process in which the electrode to which the nanotube is attached in a protruding fashion and a holder are caused to approach very closely to each other, so that the base end portion of the nanotube is caused to adhere to the holder surface in a state in which the tip end portion of the nanotube is caused to protrude, and a third process in which an electric current is caused to flow between the nanotube and the holder so that the base end portion of the nanotube is fused to the holder.

In addition, the present invention provides a method for manufacturing an electronic device surface signal operating probe, and this method comprises a first process in which a voltage is applied across electrodes in an electrophoretic solution in which a nanotube that constitutes the probe needled is dispersed, so that this nanotube is caused to adhere to the electrodes in a protruding fashion, a second process in which the electrode to which the nanotube is attached in a protruding fashion and a holder are caused to approach very closely to each other, so that the base end portion of the nanotube is caused to adhere to the holder surface in a state in which the tip end portion of the nanotube is caused to protrude, and a third process in which the base end portion of the nanotube is fused to the holder by irradiation with an electron beam.

The present invention provides a surface signal operating probe and a method for manufacturing the same, in which the nanotube is a carbon nanotube, BCN type nanotube or BN type nanotube.

The term "electronic device" used in the present invention refers to an electronic device that uses a probe for the operation of surface signals. For examples, such electronic devices include scanning probe microscopes; these are devices that image the arrangement of surface atoms of a sample using a probe. Furthermore, such electronic devices also include magnetic information processing devices; for example, magnetic disk drives such as hard disks, etc., input and output magnetic information using a magnetic head as a probe. Accordingly, the surface signal operating probe of the present invention includes not only cases in which conditions or signals of the opposite surface are detected, but also cases in which signals are exchanged with the opposite surface.

Below, the present invention will be described in detail using mainly a scanning probe microscope as the electronic device of the present invention.

The term "scanning probe microscope" refers to a microscope which detects physical and chemical actions from the atoms of the sample surface by means of the probe needle of a probe, and develops an image of the sample surface from such detection signals while scanning the probe needle over the surface of the sample. The probe needle is a sensor which detects physical and chemical actions; the probe refers to a device to which the probe needle is attached. The structure of the probe varies according to the types of physical and chemical actions detected, i.e., according to the type of microscope. However, what is common to all such probes is a fine probe needle and a probe needle holder to which this probe needle is integrally fastened. In the present invention, a nanotube is used as the probe needle.

Scanning probe microscopes include scanning tunnel microscopes (STM) which detect a tunnel current, atomic force microscopes (AFM) which detect surface indentations and projections using the van der Waals force, leveling force microscopes (LFM) which detect surface differences by means of frictional force, magnetic force microscopes (MFM) which detect magnetic interactions between a magnetic probe needle and magnetic field regions on the sample surface, electric field force microscopes (EFM) which apply a voltage across the sample and probe needle, and detect the electric field force gradient, and chemical force microscopes (CFM) which image the surface distribution of chemical functional groups, etc. What these microscopes have in common is that they all detect characteristic physical or chemical actions by means of a probe needle, and thus attempt to detect surface information with a high resolution at the atomic level.

BEST MODE FOR CARRYING OUT THE INVENTION

In order to describe the present invention in greater detail, the invention will be described with reference to the accompanying drawings.

Figure 1:
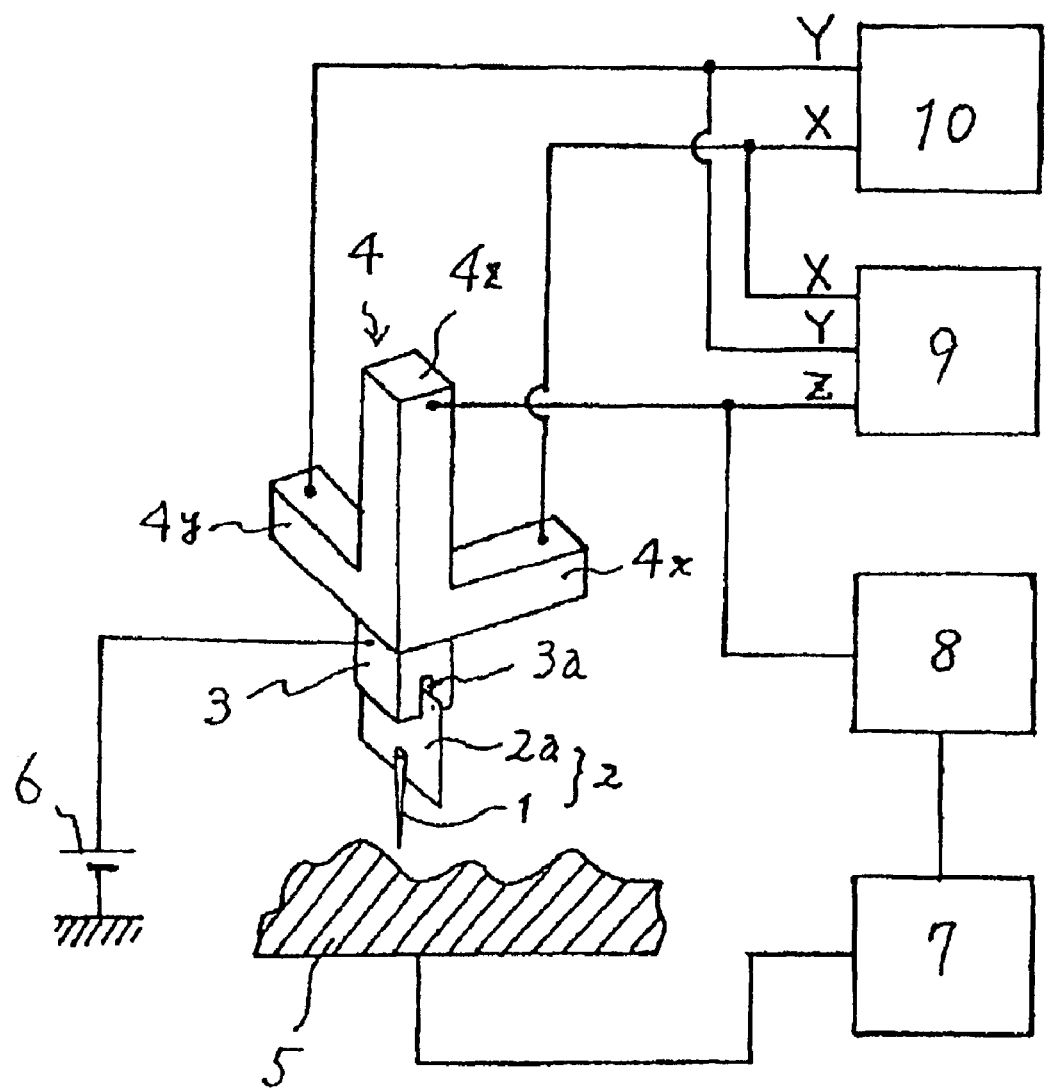
FIG. 1 is a structural diagram of a scanning tunnel microscope (STM).

FIG. 1 is a structural diagram of a scanning tunnel microscope (STM) to which the present invention is applied. The nanotube probe needle 1 is fastened to a holder 2a to form a detection probe 2. The method of fastening will be described later. This holder 2a is inserted into the cut groove 3a of a holder setting part 3, and is fastened in place by means of spring pressure so that the holder 2a can be detached. A scanning driving part 4 comprises an X piezo-electric element 4x, a Y piezo-electric element 4y and a Z piezoelectric element 4z scans the holder setting part 3 by expanding and contracting in the X, Y and Z directions, and thus causes scanning of the nanotube probe needle 1 relative to the sample 5. The reference numeral 6 is a bias power supply, 7 is a tunnel current detection circuit, 8 is a Z-axis control circuit, 9 is an STM display device, and 10 is an XY scanning circuit.

The Z axis control circuit controls the nanotube probe needle 1 by expansion and contraction in the Z direction so that the tunnel current remains constant at each XY position. This amount of movement corresponds to the amount of indentation or projection in the Z axis direction. As the nanotube probe needle 1 is scanned in the X and Y directions, a surface-atomic image of the sample 5 is displayed by the STM display device. When the nanotube probe needle 1 is replaced in the present invention, the holder 2a is removed from the holder setting part 3, and the probe 2 is replaced as a unit.

Figure 2:
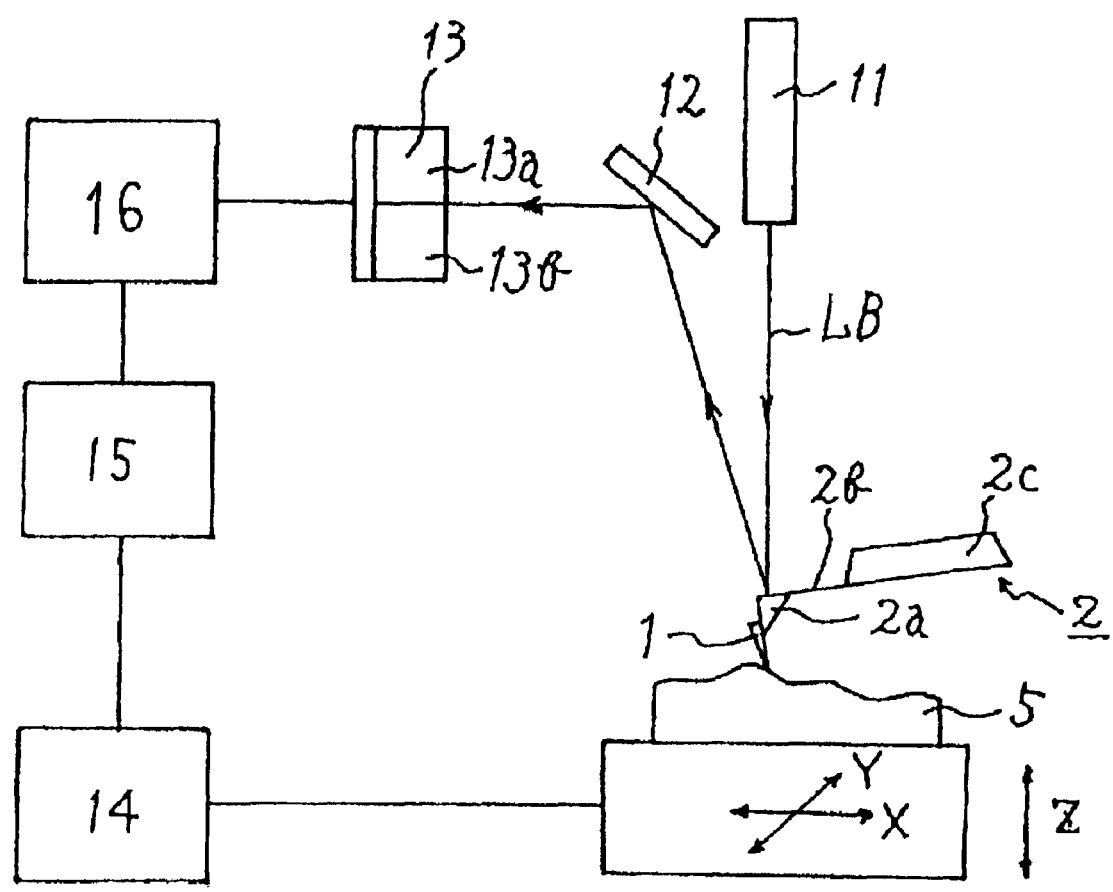
FIG. 2 is a structural diagram of an atomic force microscope (AFM).
Figure 27:
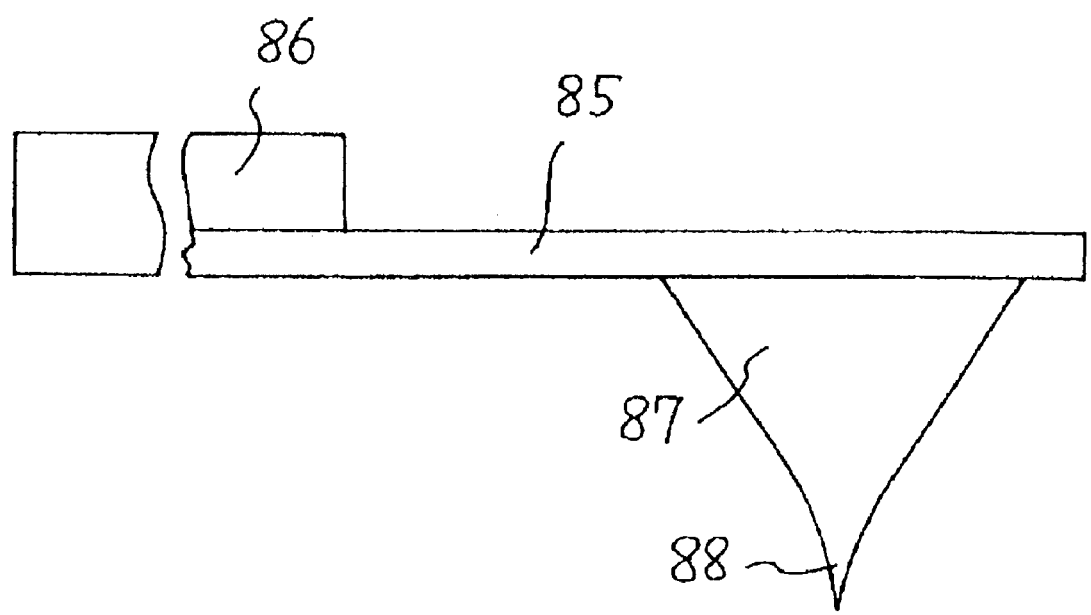
FIG. 27 is a schematic diagram of a conventional AFM probe needle.
Figure 28:
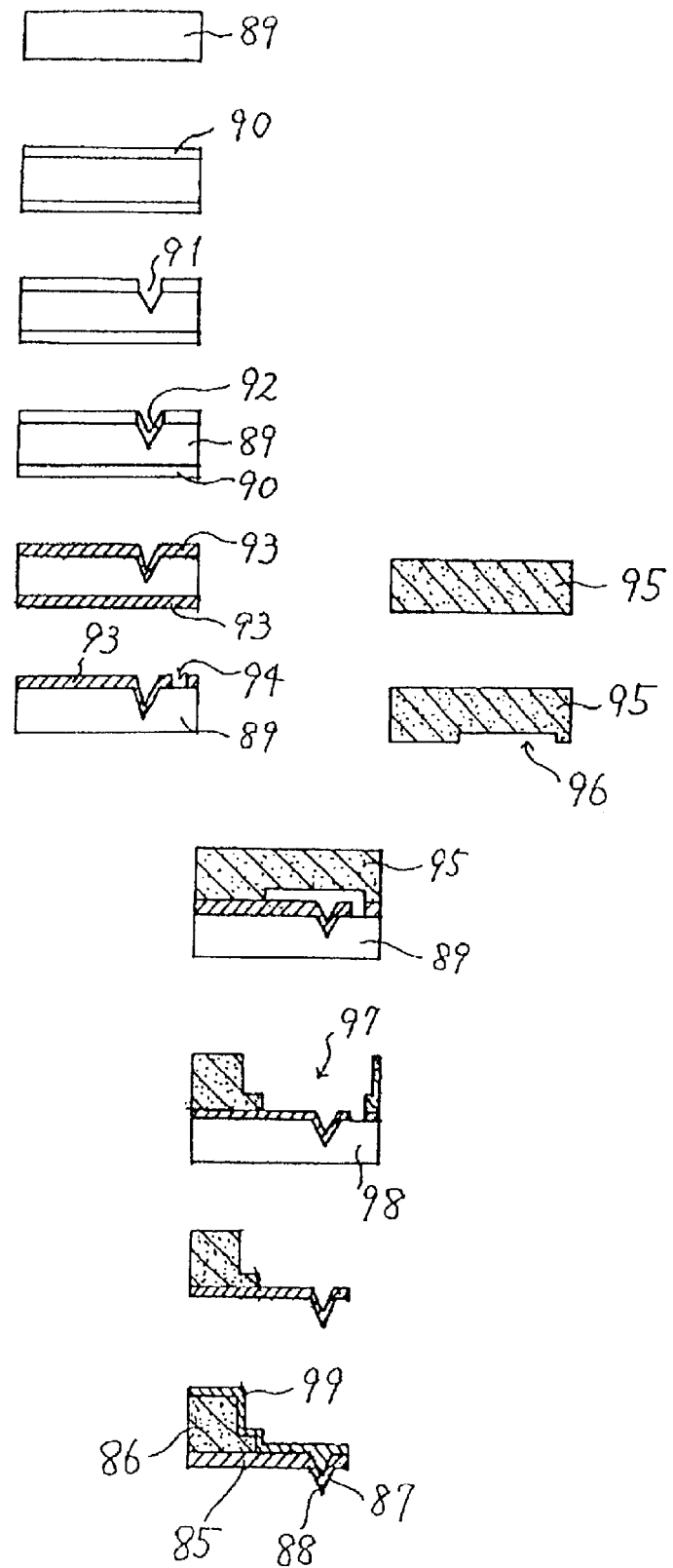
FIG. 28 is a process diagram showing a semiconductor planar technique for a conventional AFM probe needle.

FIG. 2 is a structural diagram of an atomic force microscope (AFM) to which the present invention is applied. The nanotube probe needle 1 is fastened to a holder 2a. The holder 2a is a pyramid-form member formed on the tip end of a cantilever 2b. The cross section of this pyramid is a right-angled triangle, and the probe needle 1 is fastened to the perpendicular surface; accordingly, the probe needle 1 contacts the sample surface more or less perpendicularly, so that the shape of the sample surface can be accurately read. The cantilever 2b is fastened to a substrate 2c and fastened in a detachable manner to a holder setting part (not shown). In this configuration, the nanotube probe needle 1, holder 2a, cantilever 2b and substrate 2c together constitute the probe 2; when the probe needle is replaced, the entire probe 2 is replaced. For example, if the conventional pyramid-form probe needle 87 shown in FIG. 27 is utilized as the holder 2a, the nanotube probe needle can be fastened to this by a method described later. The sample 5 is driven in the X, Y and Z directions by a scanning driving part which is a piezo-electric element. 11 indicates a semiconductor laser device, 12 indicates a reflective mirror, 13 indicates a two-part split light detector, 14 indicates an XYZ scanning circuit, 15 indicates an AFM display device, and 16 indicates a Z axis detection circuit.

The sample 5 is caused to approach the nanotube probe needle 1 in the direction of the Z axis until the sample 5 is in a position where a specified repulsive force is exerted; and afterward, the scanning driving part 4 is scanned in the X and Y directions by the scanning circuit 14 with the Z position in a fixed state. In this case, the cantilever 2b is caused to bend by the indentations and projections of the surface atoms, so that the reflected laser beam LB enters the two-part split light detector 13 after undergoing a positional displacement. The amount of displacement in the direction of the Z axis is calculated by the Z axis detection circuit 16 from the difference in the amounts of light detected by the upper and lower detectors 13a and 13b, and an image of the surface atoms is displayed by the AFM display device 15 with this amount of displacement as the amount of indentation and projection of the atoms. This device is constructed so that the sample 5 is scanned in the X, Y and Z directions. However, it is also possible to scan the probe needle side, i.e., the probe 2, in the X, Y and Z directions. The nanotube probe needle 1 may be caused to vibrate so that it lightly strikes the surface of the sample 5.

The nanotube probe needle 1 shown in FIGS. 1 and 2 is a nanotube itself, such as a carbon nanotube, BCN type nanotube or BN type nanotube, etc. Of these various types of nanotubes, the carbon nanotube (also referred to as "CNT" below) was discovered first. In the past, diamond, graphite and amorphous carbon have been known as stable allotropes of carbon. The structures of these allotropes were also in states that were more or less determined by X-ray analysis, etc. In 1985, however, fullerene, in which carbon atoms are arranged in the form of a soccer ball, was discovered in a vapor cooled product obtained by irradiating graphite with a high-energy laser, and this compound was expressed as $C_{60}$. In 1991, furthermore, carbon nanotubes, in which carbon atoms are arranged in a tubular form, were discovered in a cathodic deposit produced by means of a DC arc discharge.

BCN type nanotubes were synthesized on the basis of the discovery of such carbon nanotubes. For example, a mixed powder of amorphous boron and graphite is packed into a graphite rod, and is evaporated in nitrogen gas. Alternatively, a sintered BN rod is packed into a graphite rod, and is evaporated in helium gas. Furthermore, an arc discharge may be performed in helium gas with $BC_4N$ used as the anode and graphite used as the cathode. BCN type nanotubes in which some of the C atoms in a carbon nanotube are replaced by B atoms and N atoms have been synthesized by these methods, and multi-layer nanotubes in which BN layers and C layers are laminated in a concentric configuration have been synthesized.

Very recently, furthermore, BN type nanotubes have been synthesized. These are nanotubes which contain almost no C atoms. For example, a carbon nanotube and powdered $B_2O_3$ are placed in a crucible and heated in nitrogen gas. As a result, the carbon nanotube can be converted into a BN type nanotube in which almost all of the C atoms of the carbon nanotube are replaced by B atoms and N atoms.

Accordingly, not only carbon nanotubes, but also general nanotubes such as BCN type nanotubes or BN type nanotubes, etc., can be used as the nanotubes of the present invention.

Since these nanotubes have more or less the same substance structure as carbon nanotubes, carbon nanotubes will be used as an example in the structural description below.

Figure 3:
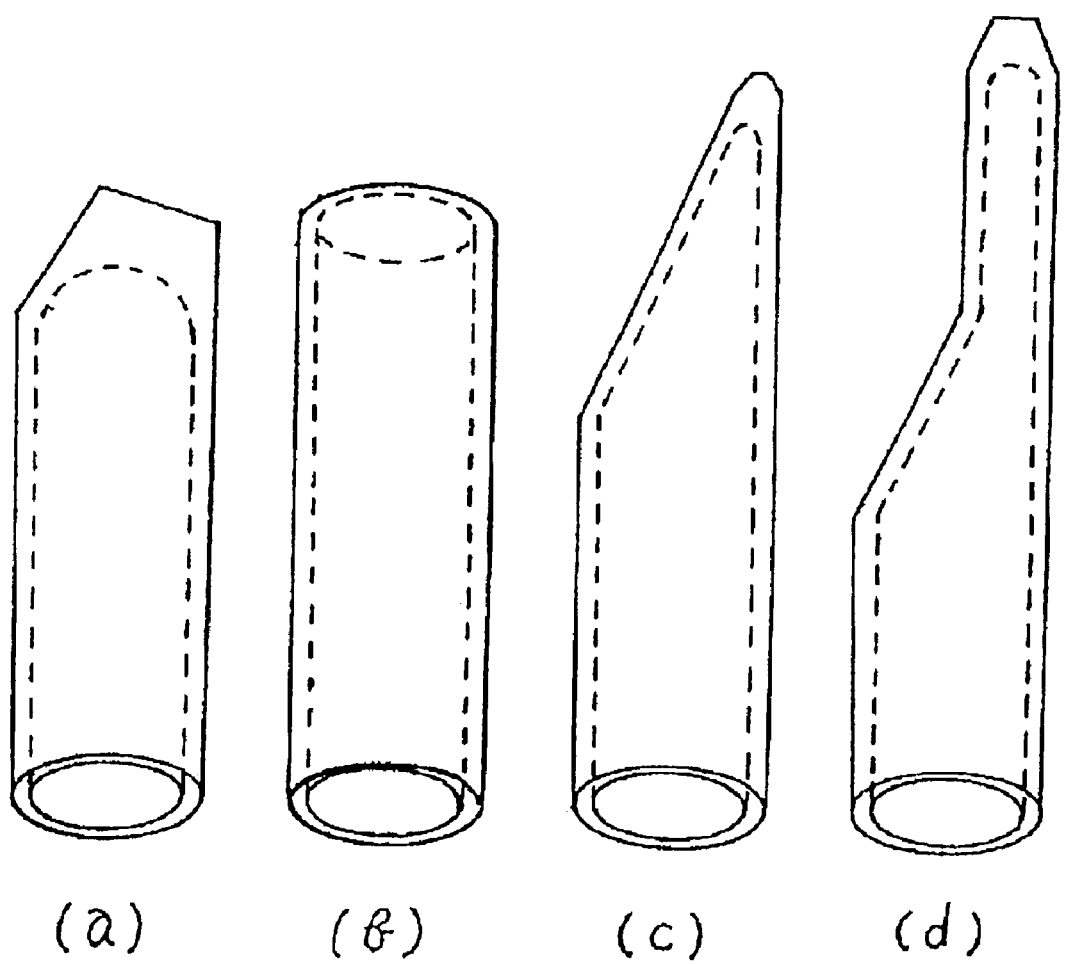
FIG. 3 shows perspective views of various tip end shapes of carbon nanotubes (CNT).

Carbon nanotubes (CNT) is a cylindrical carbon substance with a quasi-one-dimensional structure which has a diameter of approximately 1 nm to several tens of nanometers, and a length of several microns. Carbon nanotubes of various shapes, as shown in FIG. 3, have been confirmed from transmission electron micrographs. In the case of FIG. 3(a), the tip end is closed by a polyhedron, while in the case of FIG. 3(b), the tip end is open. In the case of FIG. 3(c), the tip end is closed by a conical shape, while in the case of FIG. 3(c), the tip end is closed by a beak shape. In addition, half-donut type nanotubes are also known to exist.

Figure 4:
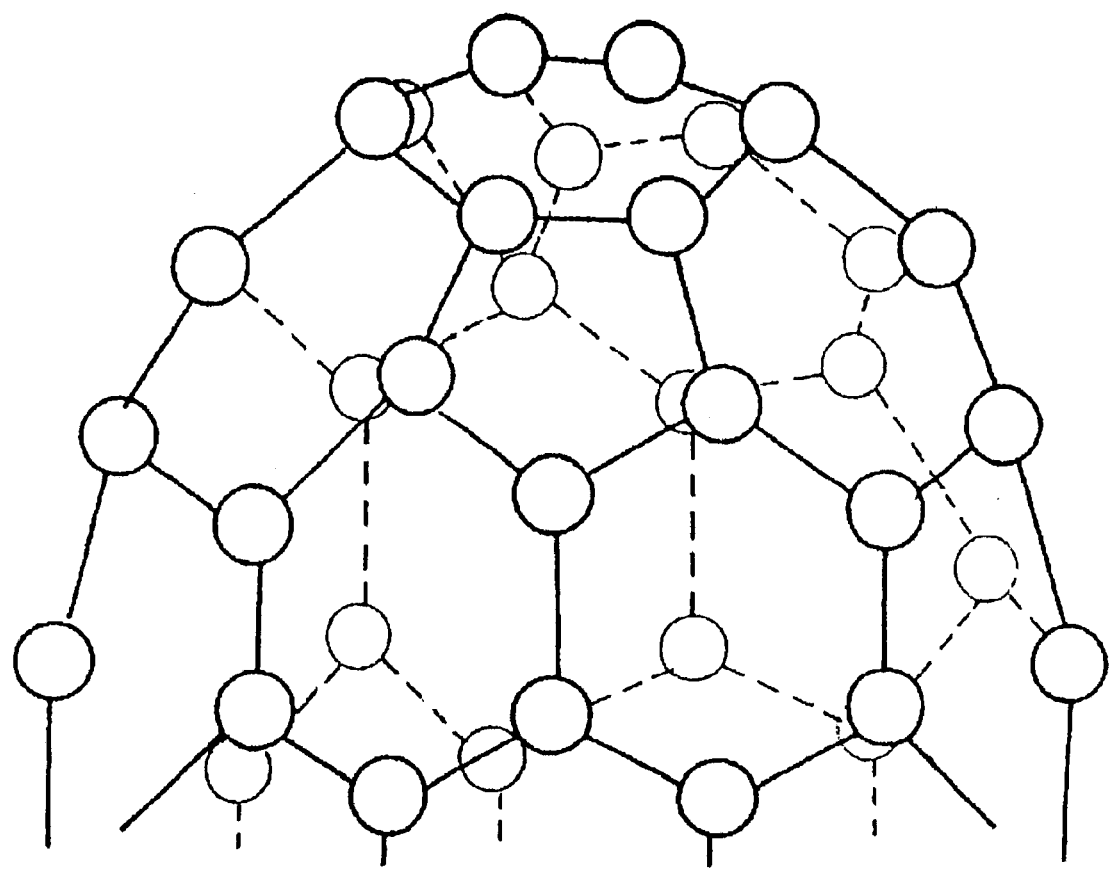
FIG. 4 is a perspective view illustrating one example of the arrangement of five-member rings and six-member rings in a CNT.

It is known that the atomic arrangement of a carbon nanotube is a cylinder which has a helical structure formed by shifting and rolling up a graphite sheet. It is known that the end surface of the cylinder of a CNT can be closed by inserting six five-member rings. The fact that there are diverse tip end shapes as shown in FIG. 3 is attributable to the fact that five-member rings can be arranged in various ways. FIG. 4 shows one example of the tip end structure of a carbon nanotube; it is seen that this structure varies from a flat plane to a curved surface as a result of six-member rings being arranged around a five-member ring, and that the tip end has a closed structure. Circles indicate carbon atoms, solid lines indicate the front side, and dotted lines indicate the back side. Since there are various possible arrangements of five-member rings, the tip end structures show diversity.

Not only carbon nanotubes, but also general nanotubes show such a tube structure. Accordingly, nanotubes show an extremely strong rigidity in the central axial direction and in the bending direction; and at the same time, like other carbon allotropes, etc., nanotubes show extreme chemical and thermal stability. Accordingly, when nanotubes are used as probe needles, these nanotubes tend not to be damaged even if they collide with atomic projections on the sample surface during scanning. Furthermore, since the cross-sectional diameters of nanotubes are distributed over a range of approximately 1 nm to several tens of nanometers (as described above), such nanotubes are most suitable as materials of probe needles which can produce sharp images of fine structures at the atomic level (if a nanotube with a small curvature radius is selected). Furthermore, since there are many nanotubes that have conductivity, nanotubes can be utilized not only as AFM probe needles, but also as STM probe needles. Furthermore, since nanotubes are difficult to break, they can also be used as probe needles in other scanning probe microscopes such as leveling force microscopes, etc.

Among nanotubes, carbon nanotubes are especially easy to manufacture, and are suited to inexpensive mass production. It is known that carbon nanotubes are produced in the cathodic deposit of an arc discharge. Furthermore, such carbon nanotubes are generally multi-layer tubes. Furthermore, it has been found that single-layer carbon nanotubes are obtained when the arc discharge method is modified and a catalytic metal is mixed with the anode. Besides the arc discharge method, carbon nanotubes can also be synthesized by CVD using fine particles of a catalytic metal such as nickel or cobalt, etc., as a substrate material. Furthermore, it is also known that single-layer carbon nanotubes can be synthesized by irradiating graphite containing a catalytic metal with high-output laser light at a high temperature. Furthermore, it has also been found that such carbon nanotubes include nanotubes that envelop a metal.

Moreover, as described above, it has been found that BCN type nanotubes and BN type nanotubes, etc., can also be inexpensively manufactured using an arc discharge process or crucible heating process, etc., and techniques for enveloping metals in nanotubes are also being developed.

However, for example, in the carbon nanotube manufacturing process, it is known that carbon nanotubes are not produced just by themselves; instead, such nanotubes are produced in a mixture with large quantities of carbon nanoparticles (hereafter also abbreviated to "CP"). Accordingly, the recovery of CNT from this mixture at a high density is a prerequisite for the present invention.

In regard to this point, the present inventors have already provided a CNT purification method and purification apparatus based on an electrophoretic process in Japanese Patent Application No. 10-280431. In this method, CNTs can be purified by dispersing the carbon mixture in an electrophoretic solution, and applying a DC voltage or AC voltage. For example, if a DC voltage is applied, the CNTs are arranged in straight rows on the cathode. If an AC voltage is applied, the CNTs are arranged in straight rows an both electrodes as a result of the formation of a non-uniform electric field. Since the degree of electrophoresis of CPs is smaller than that of CNTs, CNTs can be purified by means of an electrophoretic process utilizing this difference.

It has been confirmed that this electrophoretic method can be used to purify not only carbon nanotubes, but also BCN type nanotubes and BN type nanotubes.

This electrophoretic method is also used in the working of the present invention. Specifically, nanotubes purified and recovered by the above-described method are dispersed in a separate clean electrophoretic solution. When metal plates such as knife edges, etc., are positioned facing each other as electrodes in this solution, and a DC voltage is applied to these electrodes, nanotubes adhere to the cathode (for example) in a perpendicular configuration. If the electrodes are positioned so that a non-uniform electric field is formed in cases where an AC voltage is applied, nanotubes will adhere to both electrodes in a perpendicular configuration. These electrodes with adhering nanotubes are utilized in the manufacturing process of the present invention. Of course, other methods of causing nanotubes to adhere to a knife-edge-form metal plate may also be used.

The above-described electrophoretic solution may be any solution that is capable of dispersing the nanotubes so that the nanotubes undergo electrophoresis. Specifically, the solvent used is a dispersing liquid, and is at the same time an electrophoretic liquid. Solvents which can be used in this case include aqueous solvents, organic solvents and mixed solvents consisting of both types of solvents. For example, universally known solvents such as water, acidic solutions, alkaline solutions, alcohol, ethers, petroleum ethers, benzene, ethyl acetate and chloroform, etc., may be used. More concretely, all-purpose organic solvents such as isopropyl alcohol (IPA), ethyl alcohol, acetone and toluene, etc., may be utilized. For example, in the case of IPA, carboxyl groups are present as electrophoretic ion species. Thus, it is advisable to select the solvent used on the basis of a comprehensive evaluation of the electrophoretic performance and dispersion performance of the nanotubes, the stability of the dispersion, and safety, etc.

Figure 5:
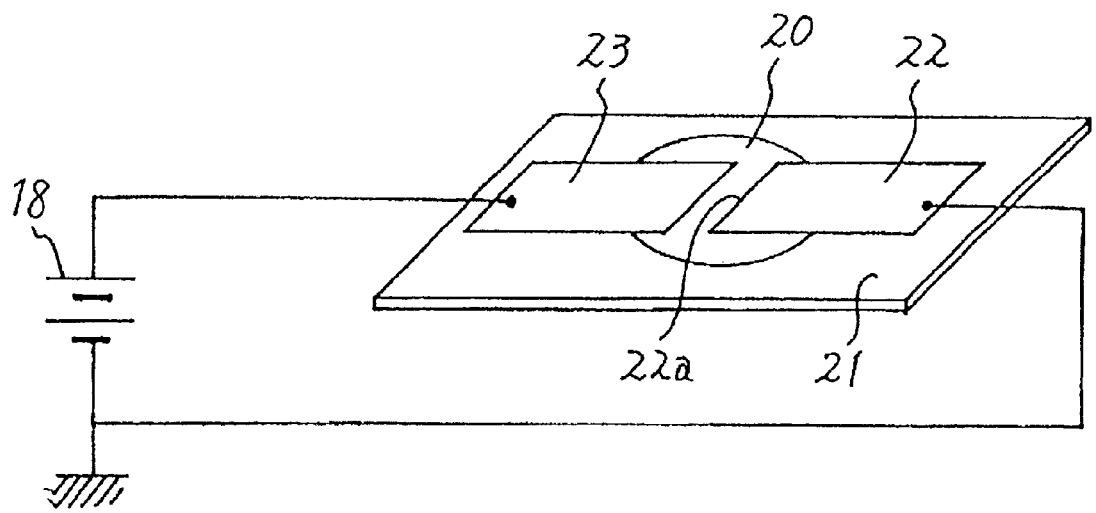
FIG. 5 is a structural diagram illustrating one example of a DC electrophoresis method.

FIG. 5 shows a case involving CNTs as one example of a DC electrophoretic process. The electrophoretic solution 20 in which the CNTs are dispersed is held inside a hole formed in a glass substrate 21. Knife edges 22 and 23 are positioned facing each other in the solution, and a DC power supply 18 is applied. Although not visible to the naked eye, countless extremely small carbon nanotubes (CNTs) are present in the electrophoretic solution. These CNTs adhere in a perpendicular configuration to the tip end edge 22a of the cathode knife edge 22. This can be confirmed under an electron microscope. In this apparatus, a non-uniform electric field in which the lines of electric force are bent in the direction perpendicular to the plane of the knife edges is formed between the two electrodes. However, this can be utilized as a DC electrophoresis apparatus even if a uniform electric field is formed. The reason for this is as follows: specifically, in the case of a non-uniform electric field, the rate of electrophoresis is merely non-uniform; electrophoresis is still possible.

Figure 6:
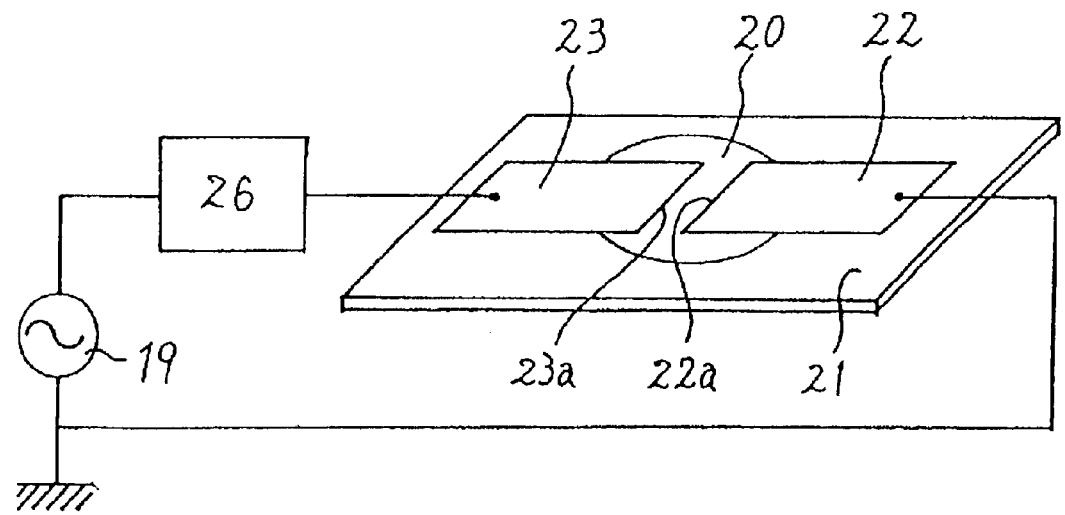
FIG. 6 is a structural diagram illustrating one example of an AC electrophoresis method.

FIG. 6 shows a case involving CNTs as one example of an AC electrophoretic process. The electrophoretic solution 20 in which the CNTs are dispersed is held inside a hole formed in a glass substrate 21. Knife edges 22 and 23 are positioned facing each other in the solution, and an AC power supply 19 is applied via an amplifier 26. A non-uniform electric field similar to that of FIG. 5 acts between the electrodes. Even if a non-uniform electric field is not intentionally constructed, local non-uniform electric fields are actually formed, so that electrophoresis can be realized. In this figure, a 5 MHz, 90 V alternating current is applied. CNTs adhere in a perpendicular configuration to the tip end edges 22a and 23a of the knife edges of both electrodes.

Figure 7:
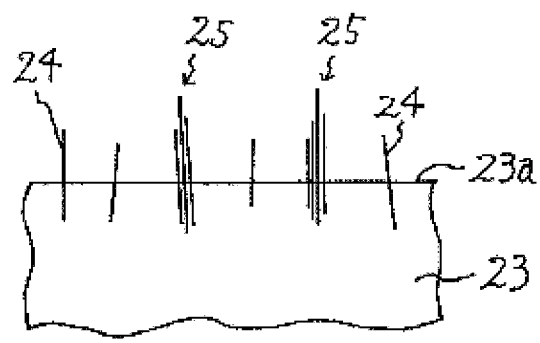
FIG. 7 is a schematic diagram showing states of adhesion of nanotubes to a knife edge.

FIG. 7 is a schematic diagram showing states of adhesion of nanotubes 24 to the tip end edge 23a of a knife edge 23. The nanotubes 24 adhere to the tip end edge 23a in a more or less perpendicular configuration, but some of the nanotubes are inclined. Furthermore, there are also cases in which a plurality of nanotubes are gathered together so that they adhere in the form of bundles; these are referred to as NT bundles 25 (also called nanotube bundles). The curvature radii of the nanotubes are distributed over a range of approximately 1 nm to several tens of nanometers. In cases where excessively slender nanotubes are selected as probe needles, such probe needles offer the advantage of allowing fine observation of indentations and projections in the atomic surface; conversely, however, such nanotubes may begin to vibrate in a characteristic mode, and in such cases, the resolution drops. Here, if an NT bundle 25 is used as a probe needle, the nanotube that protrudes the furthest forward in this bundle fulfils the function of a direct probe needle, while the other nanotubes act to suppress vibration. Accordingly, such NT bundles 25 can also be used as probe needles.

Figure 8:
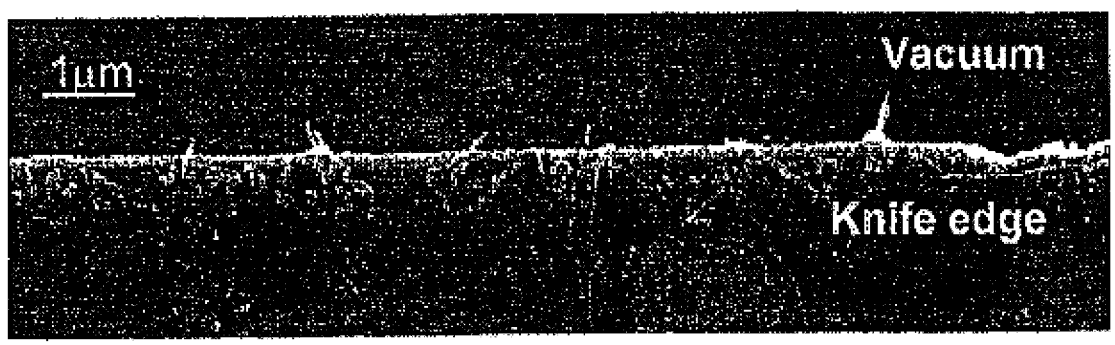
FIG. 8 is a computer image of a scanning electron microscope image of a knife edge with an adhering CNT.

FIG. 8 is a computer image of a scanning electron microscope image of a knife edge with an adhering CNT. It is seen that CNTs can easily be caused to adhere to a knife edge merely by performing an electrophoretic operation. However, CNTs more commonly adhere to the tip end edge at an inclination rather than at right angles.

The knife edge shown in FIG. 8 is subjected to a special treatment for the purpose of a strength test. This electron-microscopic apparatus contains considerable quantities of organic substances as impurities. Accordingly, it was found that when this knife edge is irradiated with an electron beam, a carbon film originating in the impurities is formed on the surface of the knife edge. The details of this phenomenon will be described later; however, this carbon film is formed on the knife edge surface so that it covers only some of the CNTs. In other words, the carbon film has the function of fastening CNTs to the knife edge that were merely adhering to the knife edge. Other nanotubes besides CNTs can be similarly treated.

Figure 9:
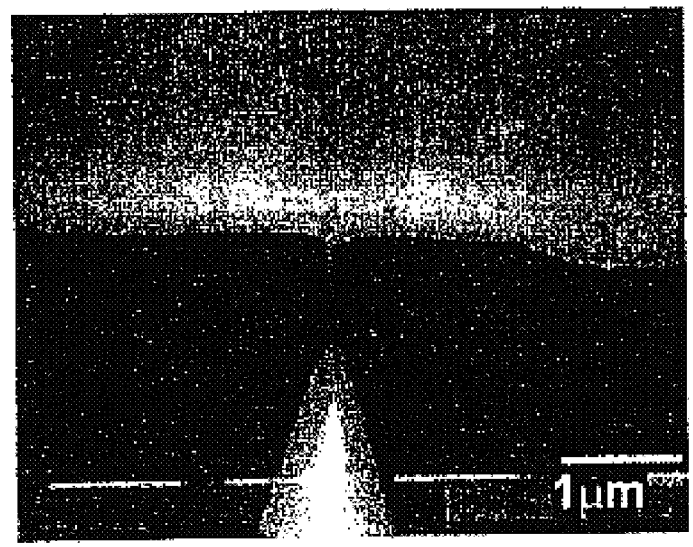
FIG. 9 is a computer image of a scanning electron microscope image showing a CNT prior to the pressing of this CNT by means of a member with a sharp tip.
Figure 10:
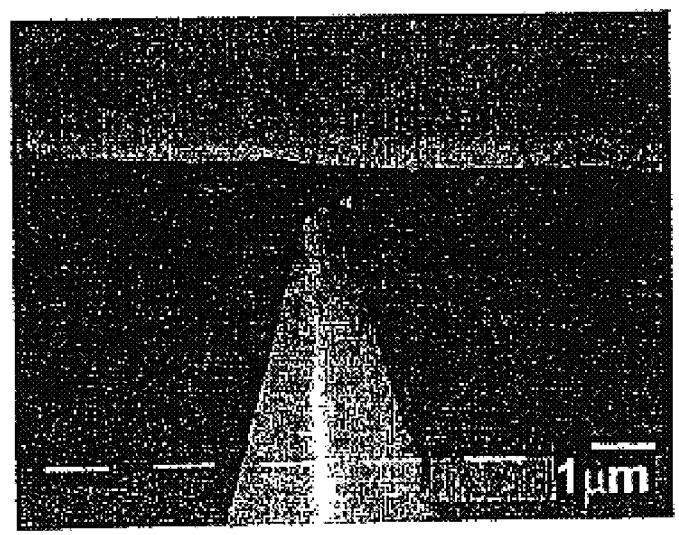
FIG. 10 is a computer image of a scanning electron microscope image showing a CNT immediately after this CNT has been pressed by means of a member with a sharp tip, wherein the CNT is bent.

The mechanical strength of CNTs on the above-described knife edge was tested. The CNTs were pressed by a member with a sharpened tip. FIGS. 9 and 10 show computer images of scanning electron microscope images obtained before and after pressing. As is clearly seen from FIG. 10, the CNT has a bending elasticity which is such that there is no breakage of the CNT even when the CNT is bent into a semicircular shape. When pressing was stopped, the CNT returned to the state shown in FIG. 9. Such a high strength and high elasticity are the reason why CNTs are not damaged even if they contact the atomic surface or are dragged across the atomic surface. This also verifies that the carbon film strongly fastens the CNTs in place. Thus, the fastening force is sufficient so that the CNTs are not separated from the knife edge even if bent. General nanotubes also have such a high strength and high elasticity; this is a major advantage of using nanotubes as probe needles.

Figure 11:
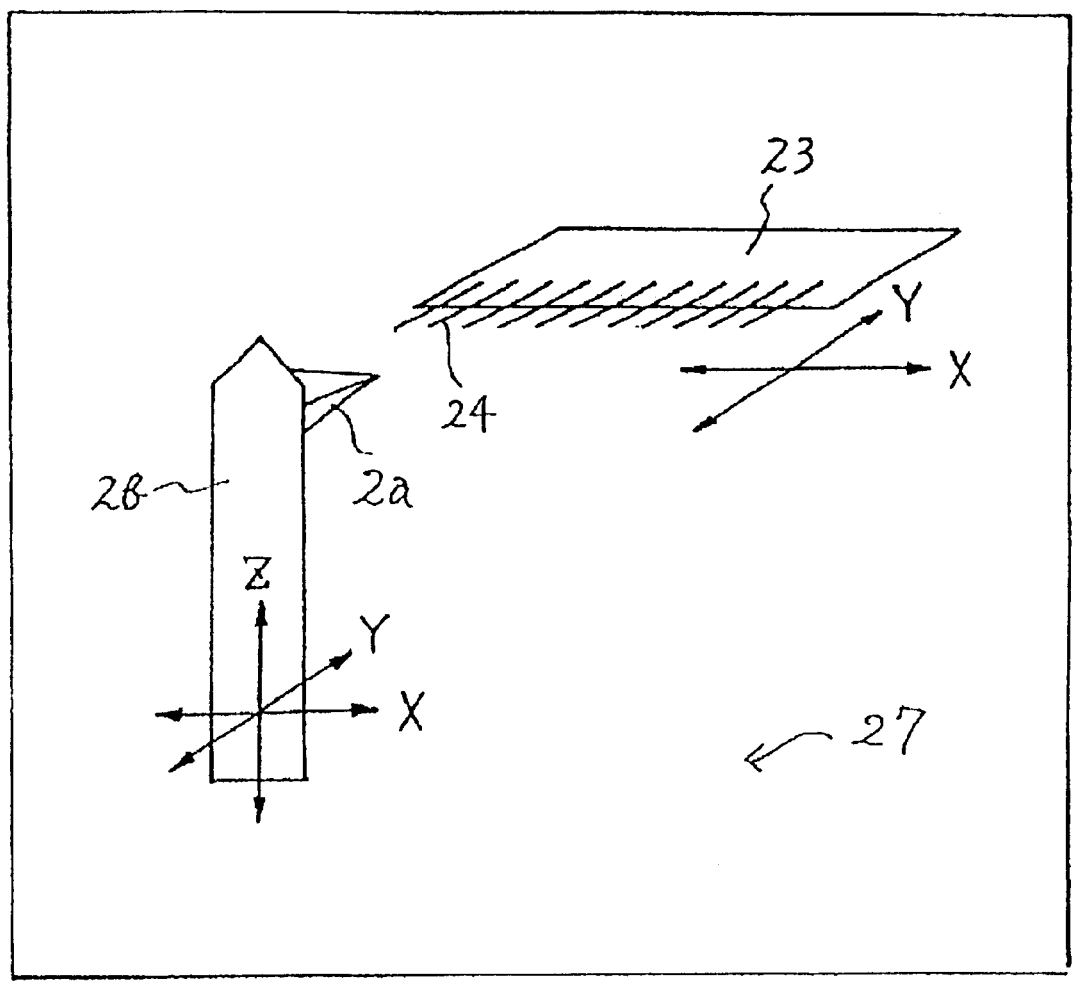
FIG. 11 is a structural diagram of a device used to transfer a nanotube to the cantilever of an AFM.

FIG. 11 is a diagram of a device used to transfer a nanotube to the cantilever of an AFM holder. A holder 2a is caused to protrude in the form of a pyramid from the tip end of a cantilever 2b. This is a member made of silicon which is manufactured using a semiconductor planar technique. Ordinarily, such a pyramid-form protruding part is used as an AFM. However, in the present invention, this pyramid-form protruding part is converted to use as a holder 2a. A nanotube 24 on the knife edge 23 is transferred to this holder 2a, and this nanotube 24 is used as a probe needle. Since the nanotubes on the knife edge are merely adhering to the knife edge, they are naturally not fastened by a film. These operations are preformed under real-time observation inside a scanning electron microscope chamber 27. The cantilever 2b can be moved three-dimensionally in the X, Y and Z directions, and the knife edge can be move two-dimensionally in the X and Y directions. Accordingly, extremely minute operations are possible.

The surface signal operating probe of the present invention is completed by transferring a nanotube adhering to the knife edge to a holder, and fastening this nanotube to the holder by a fastening means. In regard to this fastening means, two methods are used in the present invention. One is a coating film; in this case, the nanotube is fastened to the holder by means of a coating film. The second method uses a fusion-welded part; in this case, the nanotube is caused to adhere to the holder, and the contact portion is fused so that the two members are bonded to each other. Since nanotubes are extremely slender, the entire base end portion of the nanotube in contact with the holder tends to form the fusion-welded part. Fusion welding methods include fusion welding by means of an electric current and fusion welding by electron beam irradiation.

Below, concrete examples of nanotube fastening means will be described as embodiments.

Embodiment 1

[AFM Probe Fastened by a Coating Film]

Figure 12:
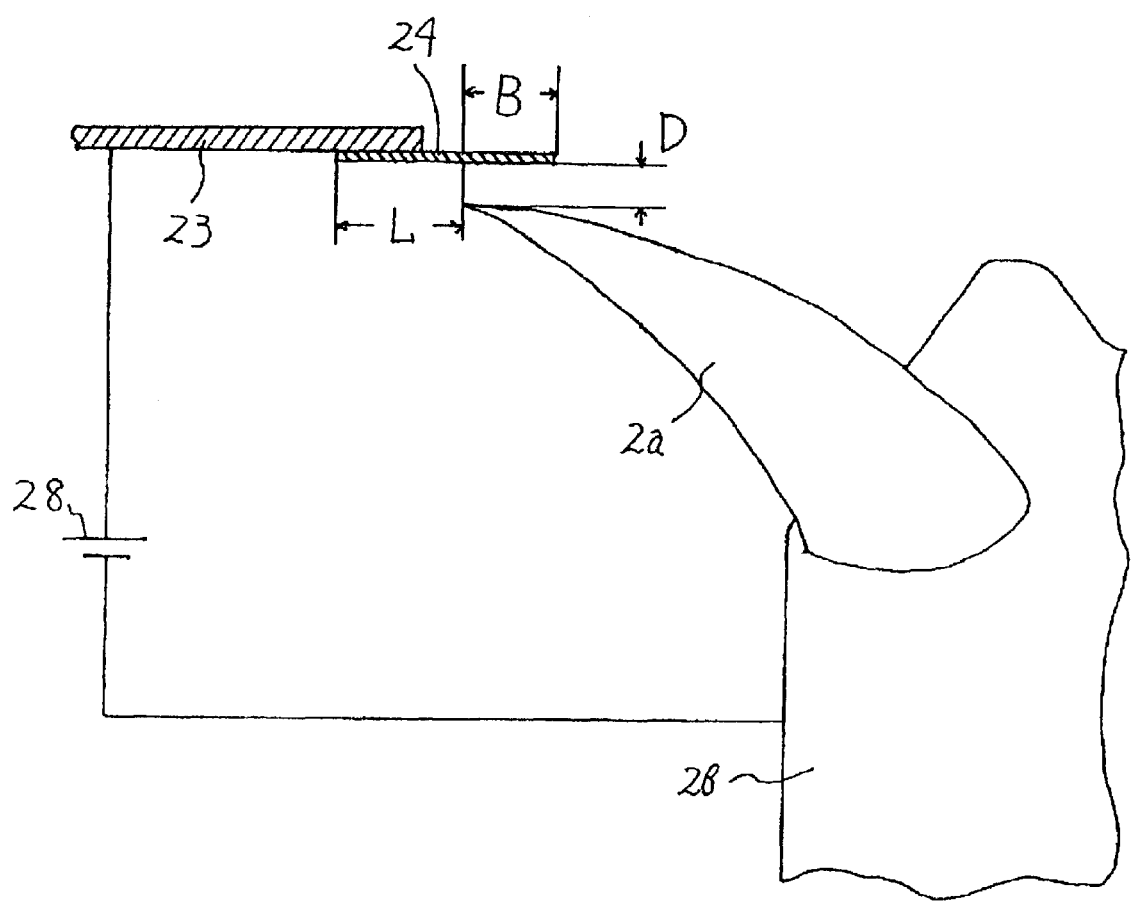
FIG. 12 is a layout diagram showing the state immediately prior to the transfer of the nanotube in Embodiment 1.

FIG. 12 is a layout diagram showing the state immediately prior to the transfer of the nanotube. While being observed under an electron microscope, the tip end of the holder 2a is caused to approach very close to the nanotube 24. The holder 2a is positioned so that the nanotube 24 is divided into a tip end portion length L and base end portion length B by the tip end of the holder 2a. Furthermore, a transfer DC power supply 28 is provided in order to promote this transfer, and the cantilever 2b is set on the cathode side. However, the polarity of the DC power supply also depends on the material of the nanotube; accordingly, the polarity is adjusted to the direction that promotes transfer. The transfer of the nanotube is promoted when this voltage is applied. A voltage of several volts to several tens of volts is sufficient. This voltage can be varied according to the transfer conditions. Furthermore, this power supply 28 may also be omitted. When the approach distance D becomes closer than a specified distance, an attractive force acts on both members, so that the nanotube 24 spontaneously jumps to the holder 2a. As the approach distance D becomes closer, the actual values of the lengths L and B approach the preset design values. This transfer may include cases in which the nanotube 24 contacts both the knife edge 23 and holder 2a; and these may be separated following the formation of the coating film.

Figure 13:
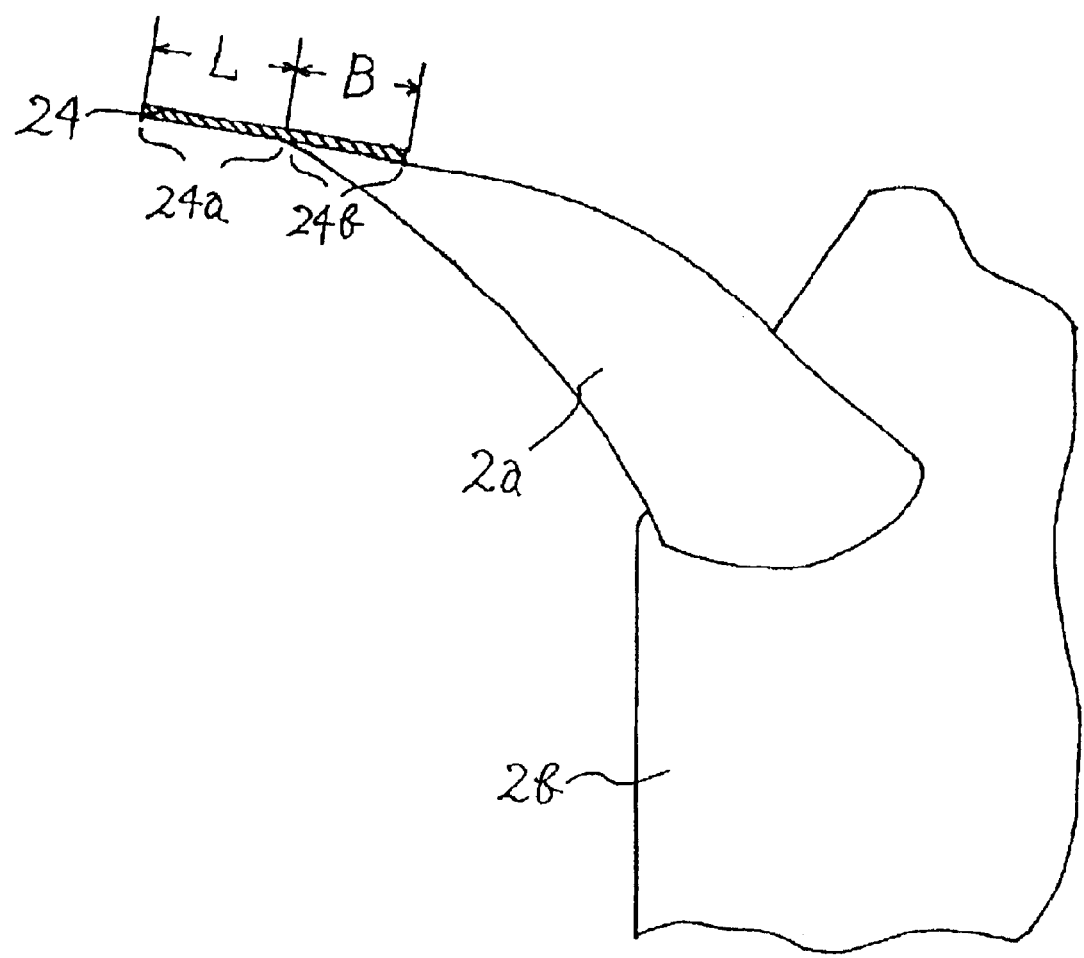
FIG. 13 is a layout diagram showing the state immediately following the transfer of the nanotube.

FIG. 13 is a layout diagram showing the state in which the nanotube 24 adheres to the holder 2a. The tip end portion 24a protrudes by the tip end portion length L, and the base end portion 24b adheres to the holder 2a by the base end portion length B. The tip end portion 24a constitutes the probe needle. It would also be possible to cause an NT bundle 25 to adhere to the holder instead of a single nanotube 24. Furthermore, if single nanotubes 24 are transferred and caused to adhere to the holder a number of times, an effect which is the same as causing an NT bundle 25 to adhere to the holder can be obtained. In cases where nanotubes are caused to adhere a number of times, the individual nanotubes can be caused to adhere after being arbitrarily adjusted. Accordingly, a stable, high-resolution probe can be manufactured in which the nanotube that protrudes furthest to the front acts as the probe needle, while the surrounding nanotubes suppress resonance of the probe needle as a whole.

Figure 14:
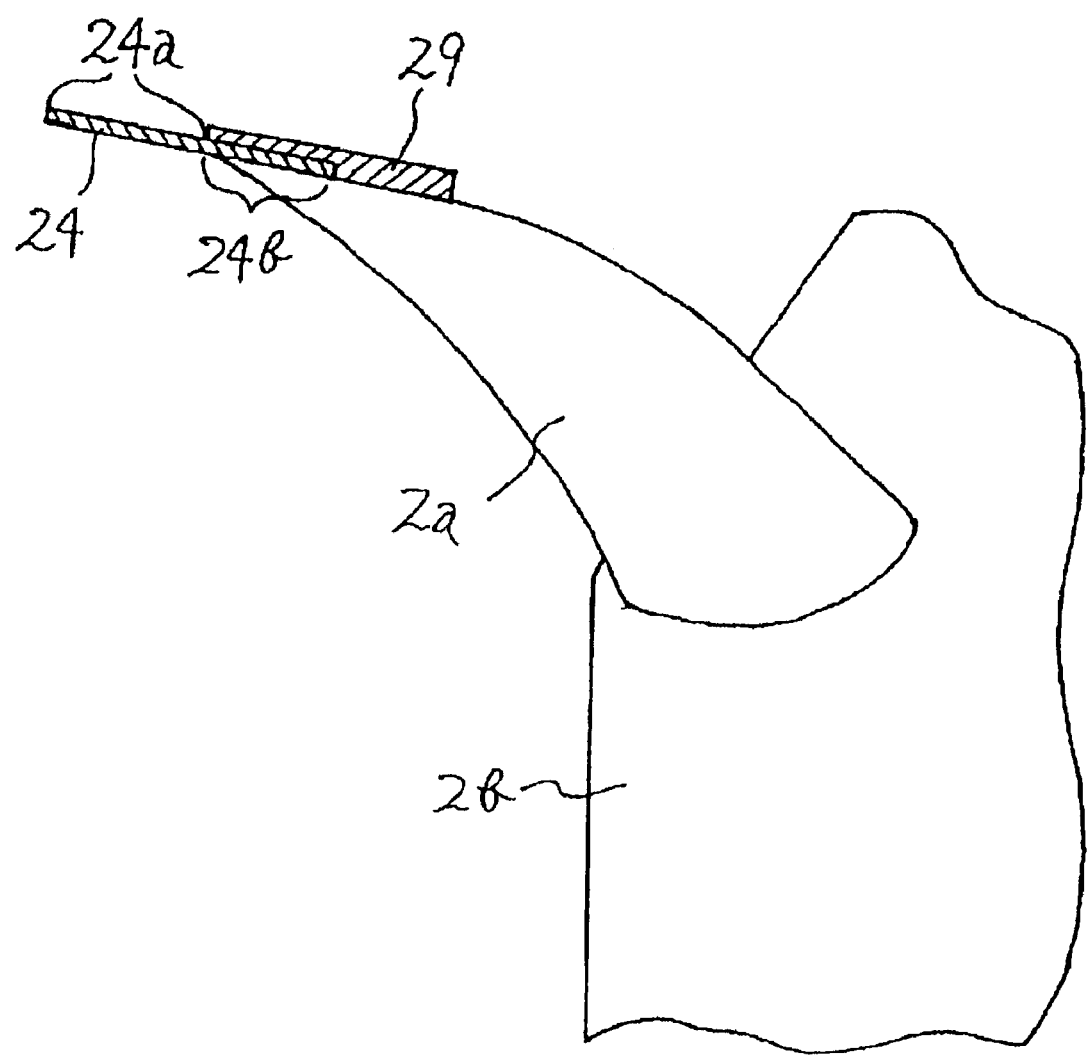
FIG. 14 is a layout diagram showing the formation of a coating film covering the nanotube.

Next, a coating film is formed over a specified region including the base end portion 24b of the nanotube 24, so that the nanotube 24 is firmly fastened to the holder 2a. As seen from FIG. 14, the coating film 29 is formed so that it covers the base end portion 24a from above. As a result of this coating film 29, even if the tip end portion 24a constituting the probe needle should catch on an atomic projection, the probe needle will merely flex into a bent state as described above. Thus, damage such as breakage of the probe needle or removal of the probe needle from the holder 2a can be prevented. If this coating film 29 is absent, the nanotube 24 will separate from the holder 2a when the tip end portion 24a catches on a projection.

Next, methods which can be used to form the coating film 29 will be described. As described above, one method which can be used is as follows: specifically, when the base end portion 24b is irradiated with an electron beam, carbon substances floating inside the electron microscope chamber 27 are deposited in the vicinity of the base end portion so that a carbon film is formed. This carbon film is used as a coating film. A second method is a method in which a very small amount of a reactive coating gas is introduced into the electron microscope chamber 27, and this gas is decomposed by means of an electron beam, so that a coating film of the desired substance is formed. In addition, general coating methods can also be employed. For example, CVD (also referred to as chemical vapor deposition) and PVD (also referred to as physical vapor deposition) can be utilized. In the case of a CVD process, the material is heated beforehand, and a reactive coating gas is caused to flow to this location, so that a coating film is reactively grown on the surface of the material. Furthermore, the low-temperature plasma method in which the reaction gas is converted into a plasma and a coating film is formed on the surface of the material is also one type of CVD method. Meanwhile, PVD methods include several types of methods ranging from simple vapor deposition methods to ion plating methods and sputtering methods, etc. These methods can be selectively used in the present invention, and can be widely used on coating film materials ranging from insulating materials to conductive materials in accordance with the application involved.

Figure 15:
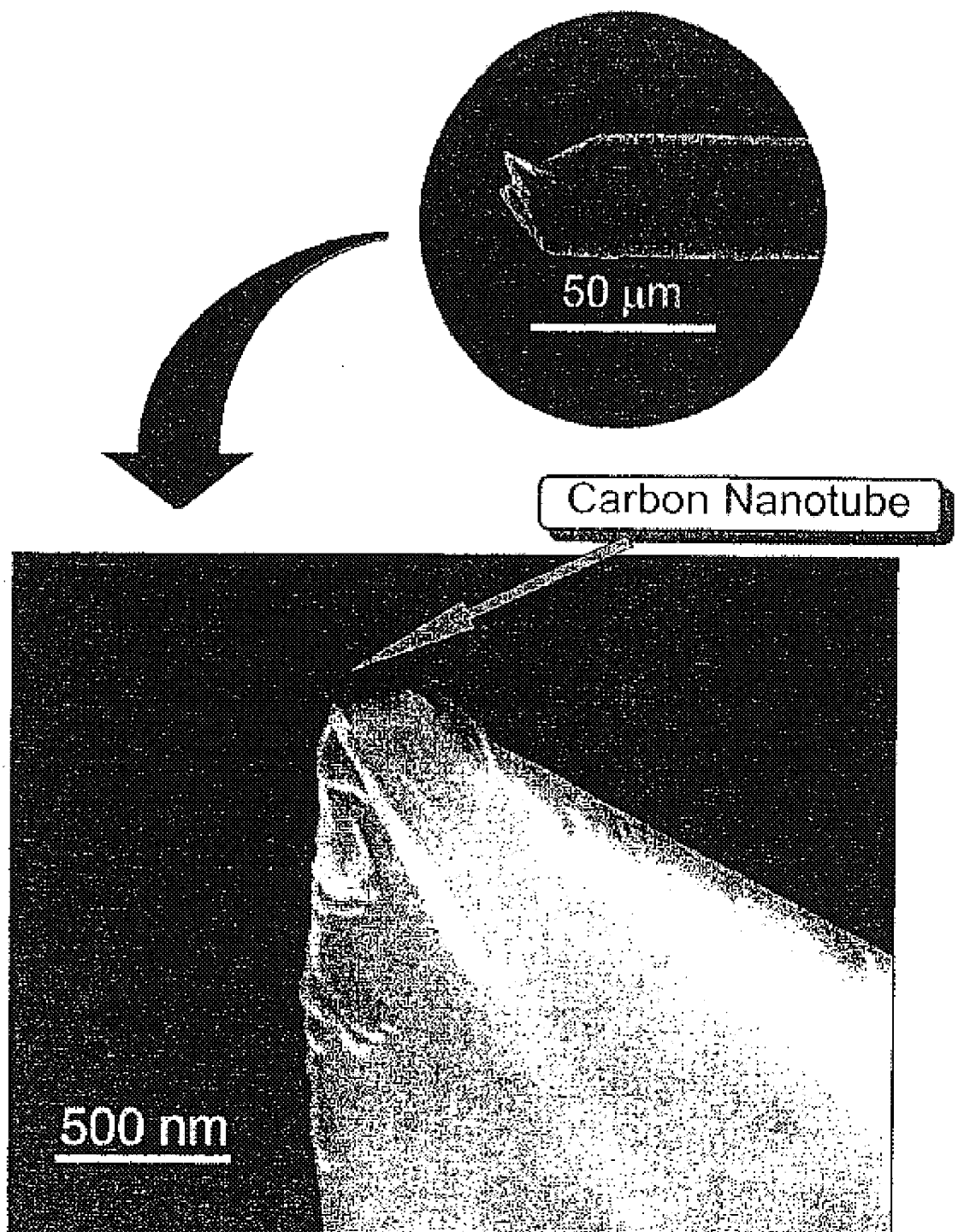
FIG. 15 is a computer image of a scanning electron microscope image of a completed AFM probe.
Figure 16:
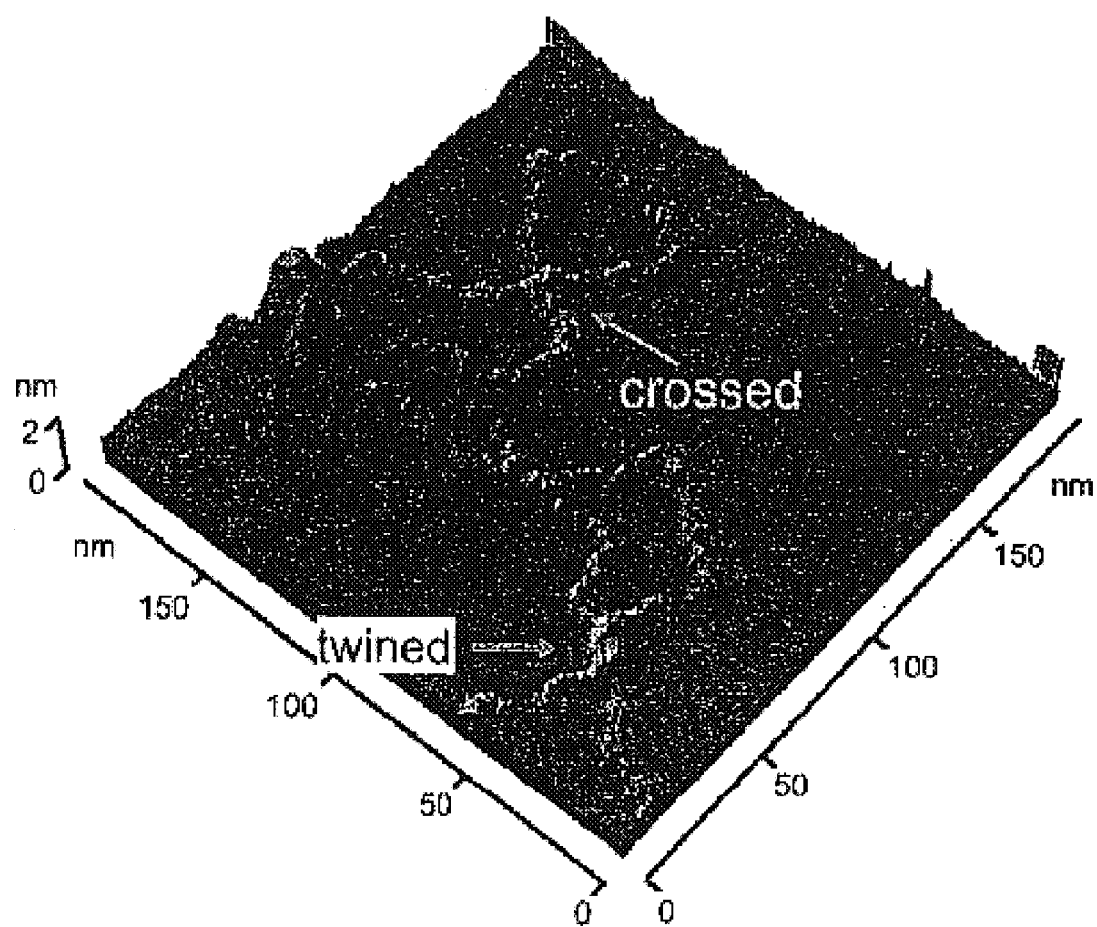
FIG. 16 is a computer image of a DNA image picked up by the completed AFM probe.

FIG. 15 is a scanning electron microscope image of a completed probe. It is seen that a CNT is fastened to the holder in accordance with the design. The present inventors took AFM images of deoxyribonucleic acid (DNA) in order to measure the resolution and stability of this probe. FIG. 16 shows an AFM image of this DNA; and the crossing and twining of the DNA were clearly imaged. To the best knowledge of the inventors, this is the first time that such clear DNA images have been obtained. Judging from FIG. 16, it appears that the tip end curvature radius of this probe constructed according to the present invention is 1.2 nm or less; it will be understood that this is extremely effective in scientific research.

Embodiment 2

[Reinforced AFM Probe Fastened by Coating Film]

Figure 17:
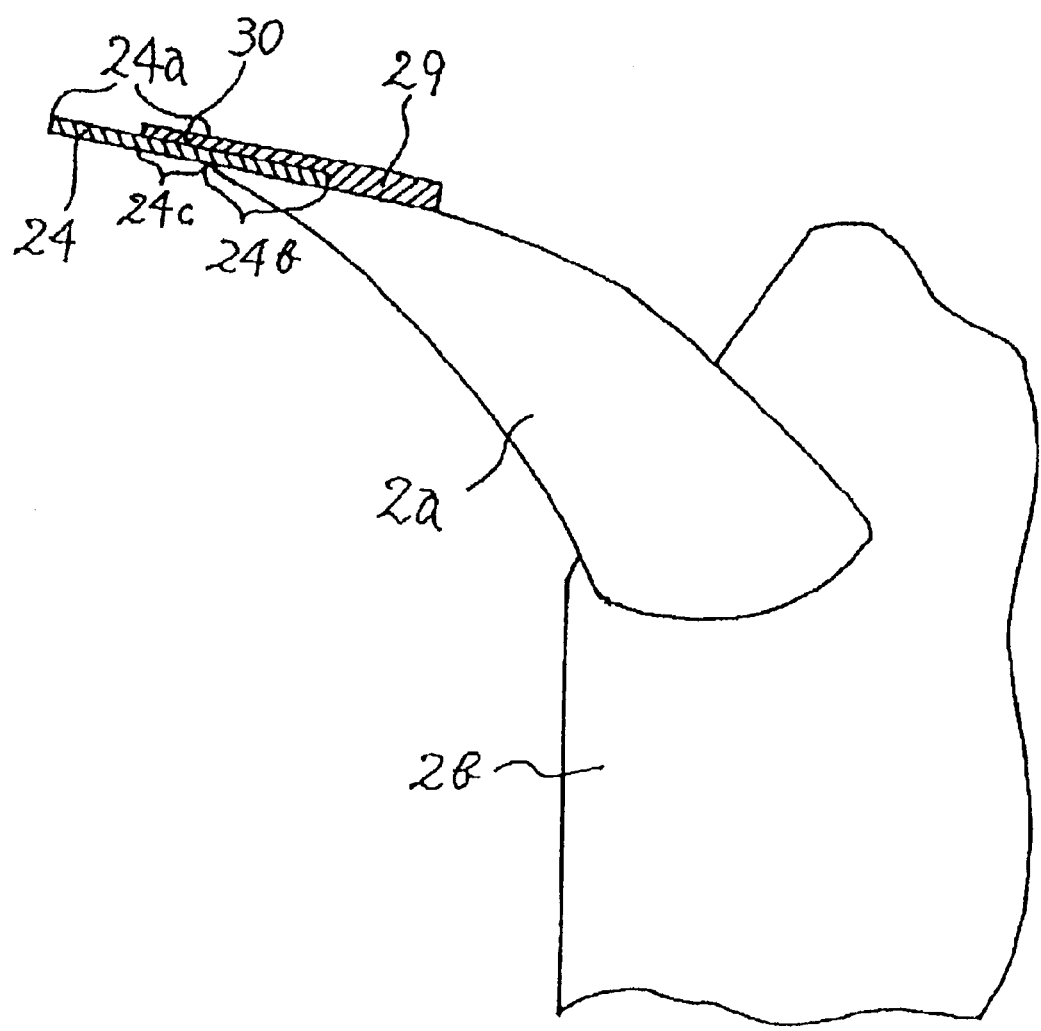
FIG. 17 is a layout diagram showing a case in which a coating film is also formed on an intermediate part constituting a region on the base end side of the tip end portion of the nanotube (as Embodiment 2).

FIG. 17 shows another coating film formation method. In order to obtain high-resolution images, it is desirable that the curvature radius of the tip end of the nanotube 24 be small. However, as described above, there are cases in which the tip end portion undergoes microscopic vibrations if the nanotube is too slender, so that the images become blurred. Accordingly, in cases where a slender nanotube 24 is used, a coating film 30 is also formed on a region of the tip end portion 24a that is close to the base end portion 24b, i.e., on an intermediate portion 24c. As a result of this coating film 30, the intermediate portion 24c is made thicker and greater in diameter, so that an effect that suppresses microscopic vibrations is obtained. This coating film 30 may be formed from the same material as the coating film 29 at the same time that the coating film 29 is formed, or may be formed from a different material. In this way, a probe needle comprising a single nanotube in which the tip end of the nanotube 24 is slender and the root of the nanotube is thick can be constructed. In other words, a high-resolution, high-reliability probe needle can be constructed from a slender nanotube, without using an NT bundle 25.

Embodiment 3

[STM Probe Fastened by Coating Film]

Figure 18:
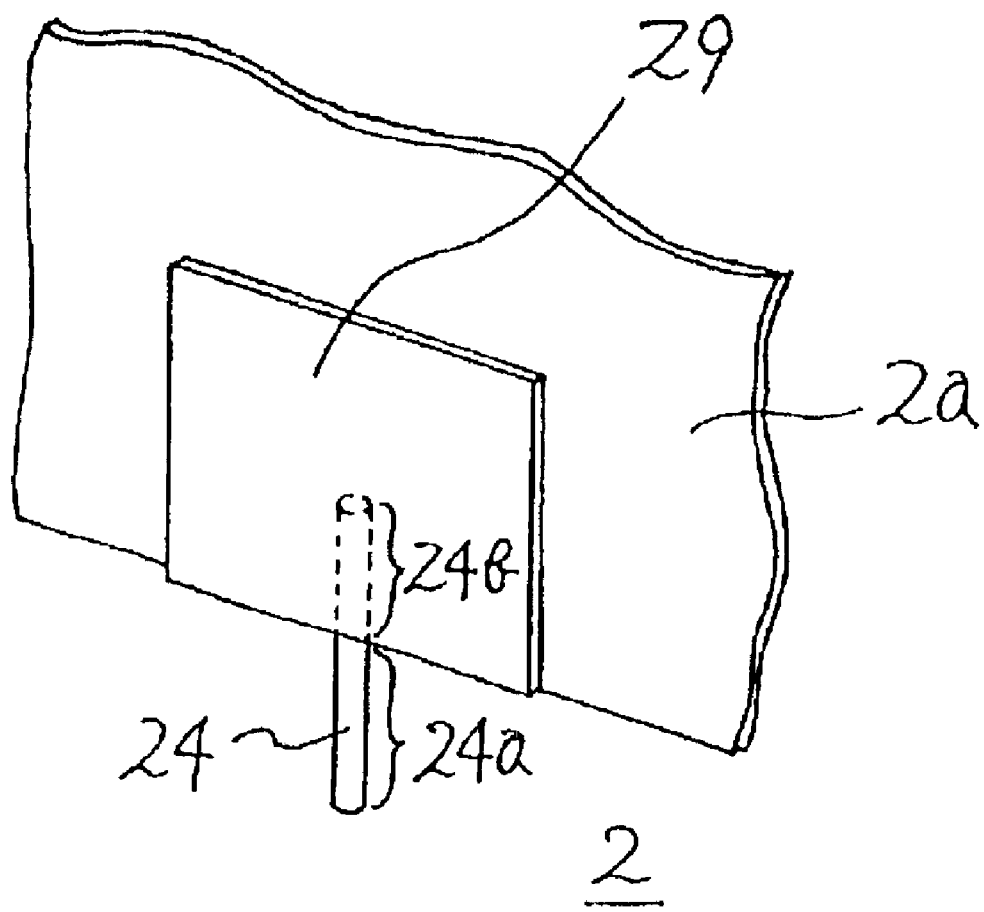
FIG. 18 is a perspective view which shows the essential parts of an STM probe as Embodiment 3.

FIG. 18 is a perspective view of the essential parts of a scanning tunnel microscope probe 2. The tip end portion 24a of a nanotube 24 is caused to protrude, and this portion constitutes the probe needle. The base end portion 24b is fastened to a holder 2a by means of a coating film 29. This probe may be easily understood by a comparison with the probe 2 in FIG. 1. The actions and effects of this probe are similar to those of Embodiment 1; accordingly, a detailed description is omitted.

Embodiment 4

[Magnetic Probe Fastened by Coating Film]

A probe similar to that shown in FIG. 18 can be utilized as an input-output probe in a magnetic disk drive. In this case, iron atoms are embedded in the tip end of the nanotube, so that the nanotube is endowed with a magnetic effect. Since a nanotube has a tubular structure, various types of atoms can be contained inside the tube. Among these atoms, magnetic atoms can be contained in the tube, so that the nanotube is endowed with magnetic sensitivity. Of course, ferromagnetic atoms other than iron atoms may also be used. Since the tip end curvature radius of a nanotube is extremely small, i.e., a value ranging from approximately 1 nm to several tens of nanometers, the input and output of data recorded at a high density in an extremely small space can be performed with high precision.

Embodiment 5

[AFM Probe Fastened by Electric Current Fusion Welding]

Figure 19:
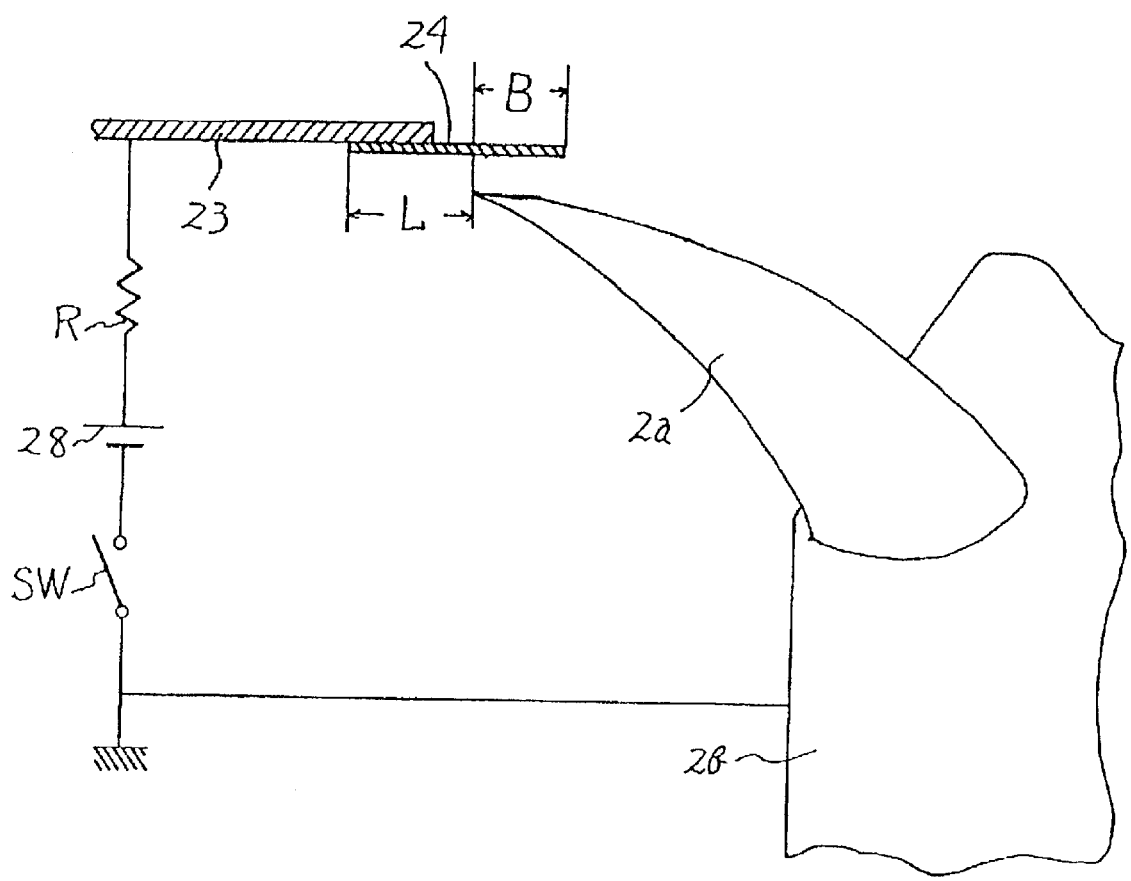
FIG. 19 is a layout diagram which shows the state immediately prior to the fusion-welding of the nanotube in Embodiment 5.

FIGS. 19 through 24 illustrate an embodiment of fusion-welding fastening of the nanotube. First, FIG. 19 is a layout diagram of the state immediately prior to fusion welding of the nanotube. The tip end of the holder 2a is caused to approach very closely to the nanotube 24 while being observed under an electron microscope. The holder 2a is positioned so that the nanotube 24 is divided into a tip end portion length L and base end portion length B by the tip end of the holder 2a. Furthermore, a high resistance R, a DC power supply 28 and a switch SW are connected between the knife edge 23 and cantilever 2b. For example, the resistance value of the high resistance R is 200 MΩ, and the voltage of the DC power supply is 1 to 100 V. In FIG. 19, in which the members are in a close proximity, the switch SW is in an open state, and no current has yet been caused to flow.

Figure 20:
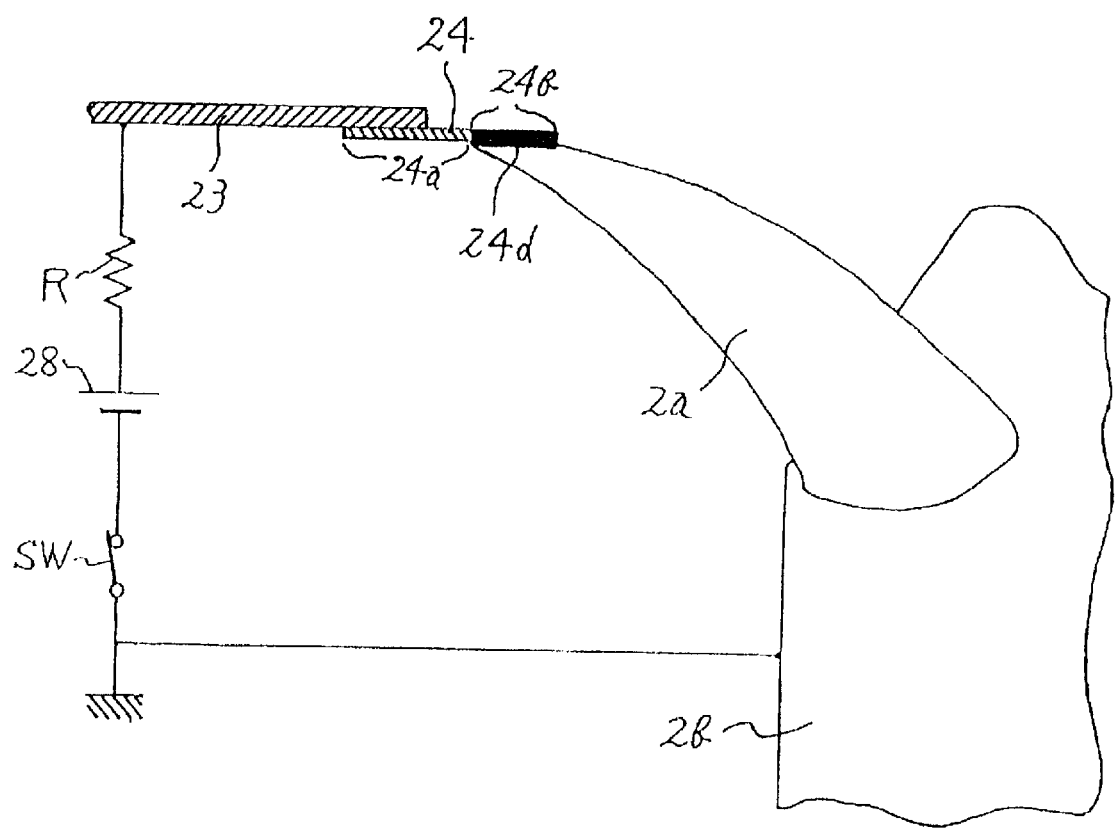
FIG. 20 is a layout diagram which shows the state immediately following the fusion-welding of the nanotube.

When the two members are caused to approach each other even more closely so that the nanotube 24 contacts the holder 2a, the state shown in FIG. 20 results. Here, the tip end portion 24a protrudes by an amount equal to the tip end portion length L, and the base end portion 24b adheres to the holder 2a for a length equal to the base end portion length B. When the switch SW is closed so that current flows in this stage, current flows between the nanotube 24 and the holder 2a, so that the base end portion 24b that is in contact with the holder 2a is fusion-welded to the holder 2a by current heating. In other words, the base end portion 24b is fused to form the fusion-welded part 24d indicated by a black color in the figure, and the nanotube 24 is firmly fastened to the holder 2a.

It is also possible to use a process in which the switch SW is closed prior to the contact between the nanotube 24 and the holder 2a, after which the base end portion 24b is converted into the fusion-welded part 24d by the flow of current caused by contact, and then the holder 2a is moved away from the knife edge 23.

In this electric current fusion welding treatment, not only is the fastening strong, but fusion welding can be reliably performed with the feeling of spot welding while confirming the object in the electron microscope, so that the product yield is increased. The DC power supply 28 may be replaced by an AC power supply or pulsed power supply. In the case of a DC power supply, fusion welding can be performed using a current of $10^{-10}$ to $10^{-6}$ (ampere-seconds (A·s)). For example, in a case where the diameter of the carbon nanotube (CNT) is 10 nm, and the length B of the base end portion is 200 nm, stable fusion welding can be performed at $10^{-9}$ to $10^{-7}$ (A·s). However, the gist of the present invention lies in the fastening of the CNT by fusion welding, and the present invention is not limited to these numerical values.

Embodiment 6

[AFM Probe Fastened by Electron Beam Fusion Welding]

The second fusion welding method is the electron beam irradiation method. When the switch SW is closed in the non-contact state shown in FIG. 19, an electric field is formed between the holder 2a and the nanotube 24. When the respective members are caused to approach each other even more closely, the nanotube 24 is caused to fly onto the holder 2a by the force of this electric field. Afterward, when all or part of the base end portion 24b of the nanotube 24 is irradiated with an electron beam, the base end portion 24b melts and is fusion-welded to the holder 2a as the fusion-welded part 24d.

In this case, the polarity of the DC power supply 28 depends on the material of the nanotube, etc. Thus, this polarity is not limited to the arrangement shown in the drawings; and the polarity is adjusted to the direction that promotes transfer.

An electric field transfer method is used in the above-described method; however, it is also possible to perform a non-electric-field transfer with the switch SW open. Specifically, when the holder 2a is caused to approach the nanotube 24 within a certain distance, a van der Waals attractive force acts between the two members, and the nanotube 24 is caused to fly onto the holder 2a by this attractive force. The surface of the holder 2a may be coated with an adhesive agent such as an acrylic type adhesive agent, etc., in order to facilitate this transfer. Following this transfer, the base end portion 24b adhering to the holder 2a is fused by irradiation with an electron beam, so that the nanotube 24 is fastened to the holder 2a via a fusion-welded part 24d. Thus, a probe similar to that obtained by current fusion welding can also be obtained by electron beam fusion welding.

Figure 21:
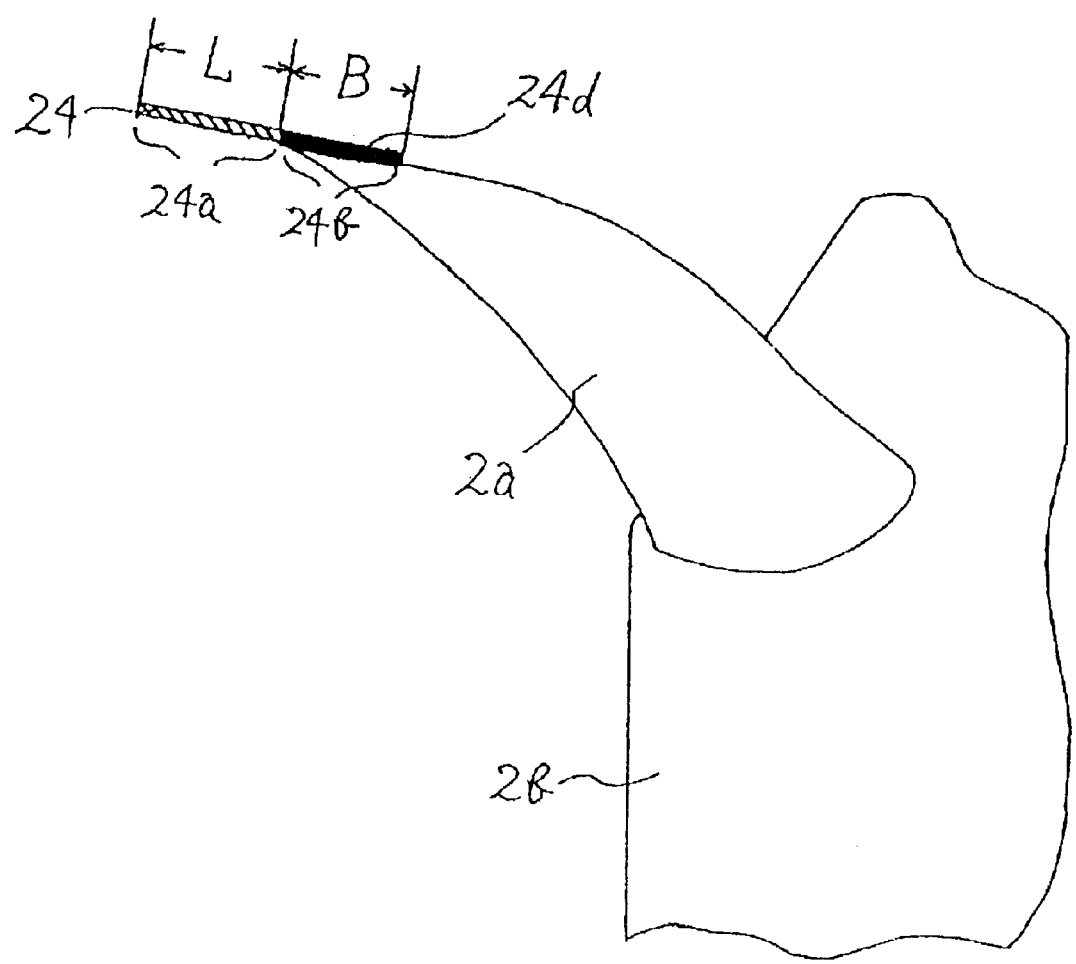
FIG. 21 is a schematic diagram of a completed AFM probe.
Figure 22:
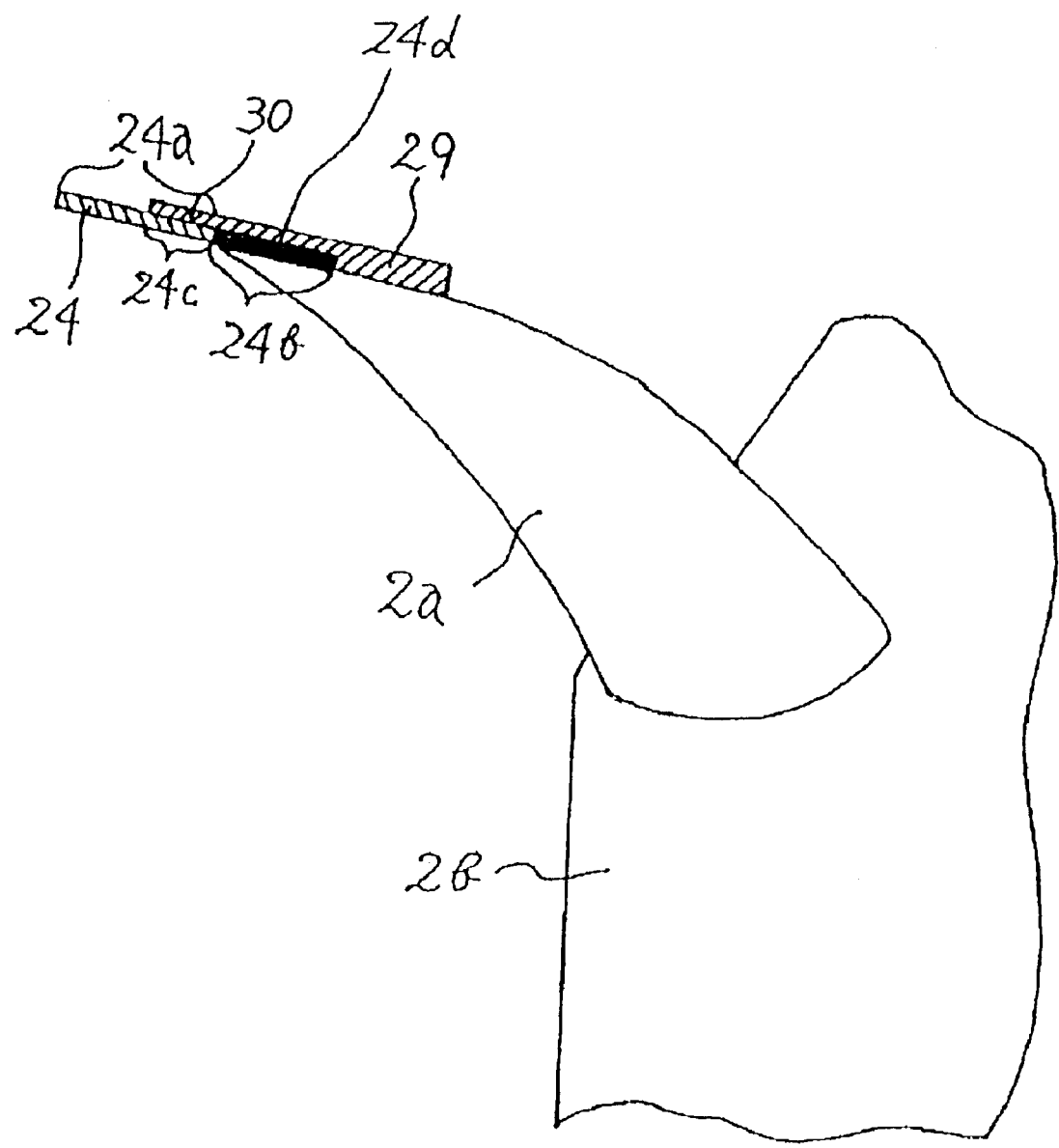
FIG. 22 is a schematic diagram showing the forming of a coating film covering the nanotube in Embodiment 7.

FIG. 21 is a schematic diagram of the completed probe following fusion welding. The tip end portion 24a constitutes the nanotube probe needle and can be used as a high-resolution probe with a tip end curvature radius of 10 nm or less. The nanotube 24 is firmly fastened to the holder 2a by means of the fusion-welded part 24d, so that the nanotube 24 does not break, bend or come loose even if subjected to a considerable impact. In the case of a carbon nanotube, it appears that the nanotube structure is destroyed and changed in amorphous carbon in the fusion-welded part 24d. If silicon is used as the material of the holder 2a, it appears that the carbon atoms that have been converted into an amorphous substance and the silicon atoms of the holder bond to form silicon carbide, so that the fusion-welded part 24d assumes a silicon carbide structure. However, detailed structural analysis of this part has not yet been completed, and this is merely conjecture at this point.

In the case of BCN type nanotubes or BN type nanotubes, structural analysis of the fusion-welded part has not yet been performed. However, it has been experimentally confirmed that the members are strongly bonded by this fusion-welded part.

As described above, in cases where the holder 2a is made of silicon, the holder 2a has a certain amount of conductivity since it is a semiconductor. Accordingly, since a voltage can be directly applied, current fusion welding is possible. Of course, the van der Waals transfer method or electron beam fusion welding method can also be used. However, in cases where the holder 2a is constructed from an insulator such as silicon nitride, the holder 2a has no conductivity. In such cases, therefore, the transfer method using the van der Waals attractive force or the electron beam fusion welding method is the optimal method. In cases where the current fusion welding method cannot be applied to an insulator, the following procedure may be used: An electrode is formed from a conductive substance on the surface of the CNT holder 2a or cantilever 2b. An electrode film is formed by means of, for instance, metal vapor deposition, etc. A voltage is applied to this film, resulting in that an electric current flows, the fusion welding phenomenon occurs, and a probe is thus obtained.

Embodiment 7
[AFM Probe Fastened by Coating Film and Fusion Welding]

In cases where a single nanotube 24 is used as a probe needle, if the tip end portion 24a of the nanotube is long and slender, it could happen that resonance occurs so that the tip end vibrates, thus causing a drop in resolution. In order to suppress such resonance, there is a method in which an additional coating film is formed on specified regions. As is clear from FIG. 22, if a coating film 30 is formed on the root side of the tip end portion 24a, this portion becomes thicker so that resonance tends not to occur. This coating region can be freely designed; accordingly, a coating film 29 which extends to the base end portion 24b may be formed. This coating film 29 has the effect of pressing the nanotube from above. Thus, together with the fusion-welded part 24d, the coating film reinforces the fastening of the nanotube 24 to the holder 2a. The thickness of the coating films 29 and 30 may be varied depending upon the case.

Next, methods for forming the coating films 29 and 30 will be described. As described above, in one method, when the base end portion 24b and intermediate portion 24c are irradiated with an electron beam, not only do these portions melt, but carbon substances floating inside the electron microscope chamber 27 are deposited in the vicinity of the base end portion so that a carbon film is formed. This carbon film can be utilized as a coating film. In another method, a trace amount of a reactive coating gas is introduced into the electron microscope chamber 27, and this gas is broken down by an electron beam, so that a coating film of the desired substance is formed. In addition, general coating methods can also be employed. For example, the CVD (also called chemical vapor deposition) or PVD (also called physical vapor deposition) can be similarly utilized. Details of these methods are omitted here.

It is also possible to fusion-weld an NT bundle 25 instead of fusion-welding a single nanotube 24. If a plurality of nanotubes 24 are fusion-welded one by one, the same effect as the fusion welding of an NT bundle 25 can be obtained. In cases where such fusion welding is performed one by one, the individual nanotube can be arbitrarily adjusted and fusion-welded. Accordingly, a stable, high-resolution probe can be obtained in which a nanotube that protrudes furthest forward acts as the probe needle, while the surrounding nanotubes suppress resonance of the probe needle as a whole.

Embodiment 8
[STM Probe Fastened by Fusion Welding]

Figure 23:
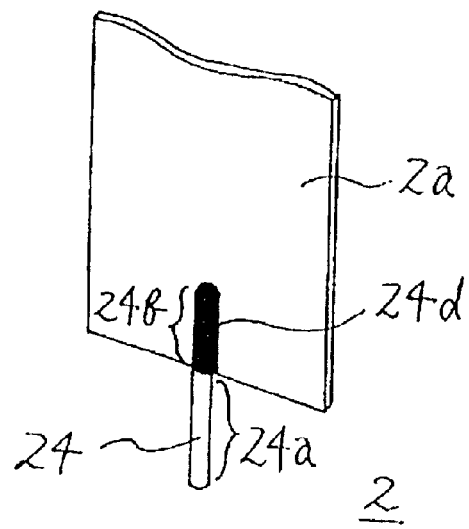
FIG. 23 is a perspective view which shows essential parts of an STM probe as Embodiment 8.

FIG. 23 is a perspective view of the essential portion of a scanning tunnel microscope. The tip end portion 24a of a nanotube 24 is caused to protrude, and this portion acts as a probe needle. The base end portion 24b forms a fusion-welded part 24d and is fusion-welded to the holder 2a. This probe will be easily understood if compared with the probe 2 shown in FIG. 1. A metal such as tungsten or a platinum-iridium alloy, etc. can be used as the material of the holder 2a. The actions and effects of this probe are similar to those of Embodiment 5. Accordingly, details thereof are omitted.

Embodiment 9
[STM Probe Fastened by Coating Film and Fusion Welding]

Figure 24:
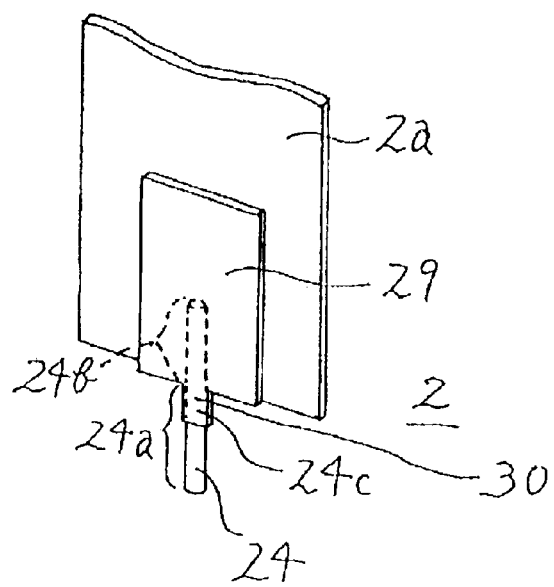
FIG. 24 is a perspective view which shows essential parts of an STM probe in a case where a coating film is formed on an intermediate part constituting a region on the base end side of the tip end portion of the nanotube, as Embodiment 9.
Figure 25:
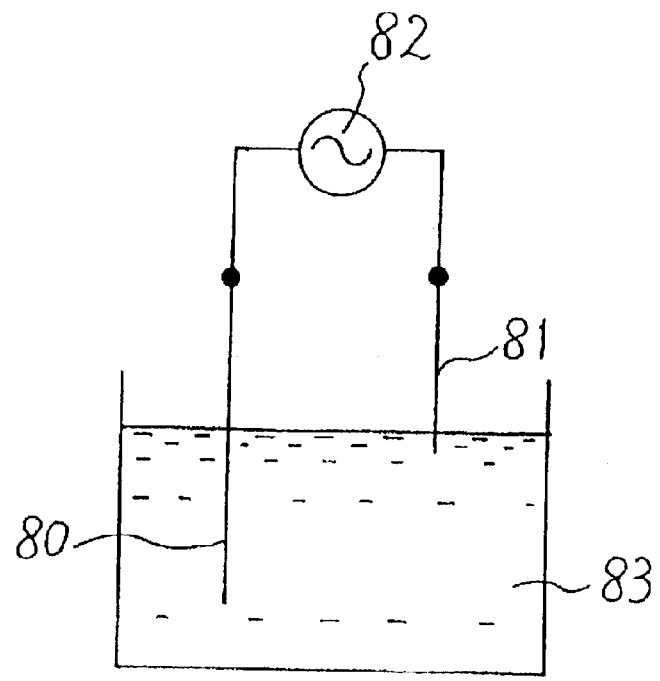
FIG. 25 is a schematic diagram of a conventional electrolytic polishing apparatus.
Figure 26:
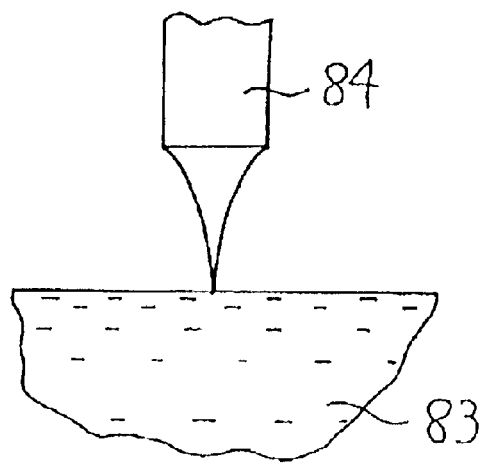
FIG. 26 is a diagram showing the completion of electrolytic polishing.

FIG. 24 shows a probe 2 in which a coating film 30 is formed on the intermediate portion 24c of the nanotube 24. This coating film 30 is installed in order to prevent vibration of the probe needle. As in FIG. 22, a coating film 29 which covers the fusion-welded part 24d may be formed. Since the actions and effects of this probe are similar to those of Embodiment 7, details are omitted.

Embodiment 10
[Magnetic Probe Fastened by Fusion Welding]

A probe similar to that shown in FIG. 23 can be utilized as an input-output probe for a magnetic disk drive. In this case, iron atoms are embedded in the tip end of the nanotube, so that the nanotube is endowed with a magnetic effect. Since a nanotube has a tubular structure, various types of atoms can be contained inside the tube. As one example, ferromagnetic items can be contained in the tube, so that the nanotube is endowed with magnetic sensitivity. Of course, ferromagnetic atoms other than iron atoms may also be used. Since the tip end curvature radius of a nanotube is extremely small, i.e., approximately 1 nm to several tens of nanometers, processing such as the input and output of data recorded at a high density in a very small space, etc. can be performed with high precision.

The present invention is not limited to the above-described embodiments; and various modifications and design changes, etc., within limits that involve no departure from the technical spirit of the present invention are included in the technical scope of the invention.

Industrial Applicability

As described in detail above, the present invention relates to an electronic device surface signal operating probe which comprises a nanotube, a holder which holds this nanotube, and a fastening means which fastens the base end portion of the nanotube to the surface of the holder in a manner that the tip end portion of the nanotube protrude, so that the tip end portion of the nanotube is used as a probe needle; and it also relates to a method for manufacturing the same. Since a nanotube is thus used as a probe needle, the tip end curvature radius is small. Accordingly, by way of using this probe needle in a scanning probe microscope, high-resolution images of surface atoms can be picked up. When this probe needle is used as the probe needle of a magnetic information processing device, the input and output of high-density magnetic information can be controlled with high precision.

Since nanotubes have an extremely high rigidity and bending elasticity, no damage occurs to nanotubes even if they should contact neighboring objects. Accordingly, the useful life of the probe can be extended. Furthermore, carbon nanotubes are present in large quantities in the cathodic deposits of arc discharges, and other BCN type nanotubes and BN type nanotubes can easily be manufactured by similar methods. Accordingly, the cost of raw materials is extremely low. In the manufacturing method of the present invention, probes can be inexpensively mass-produced, so that the cost of such probes can be lowered, thus stimulating research and economic activity. In particular, STM and AFM probes with a long useful lives that are necessary for the creation of new substances can be provided inexpensively and in large quantities. Thus, the present invention can contribute to the promotion of technical development.

What is claimed is:

1. A method of attaching nanotube to probe holder, said method being characterized in that said method comprises: first process in which nanotubes (24) to be used as a probe needle are caused to adhere to an electrode in a protruding fashion; a second process in which said electrode to which nanotubes (24) are caused to adhere in a protruding fashion and a holder (2a) are caused to approach very close to each other, so that each of said naxiotubes (24) is contacted to said holder (2a) in such a manner that a base end portion (24b) of said nanotube (24) adheres to a surface of said holder with a tip end portion (24a) of said nanotube in a protruding fashion; and a third process in which an appropriate region of said base end portion of said nanotube adhering to said surface of said holder is irradiated by an electron beam so as to form a coating treatment so that said nanotube (24) is fastened to said holder (2*a*) by a resulting coating film (29) wherein at least said second and third processes are performed by direct observation in an electron microscope.

* * * * *